US010242379B2

(12) United States Patent
Ha et al.

(10) Patent No.: US 10,242,379 B2
(45) Date of Patent: Mar. 26, 2019

(54) TRACKING VISUAL GAZE INFORMATION FOR CONTROLLING CONTENT DISPLAY

(71) Applicant: Adobe Inc., San Jose, CA (US)

(72) Inventors: Eric Ha, San Jose, CA (US); Dwight Rodgers, Mountain View, CA (US)

(73) Assignee: ADOBE INC., San Jose, CA (US)

( * ) Notice: Subject to any disclaimer, the term of this patent is extended or adjusted under 35 U.S.C. 154(b) by 150 days.

(21) Appl. No.: 14/610,859

(22) Filed: Jan. 30, 2015

(65) Prior Publication Data

US 2016/0225012 A1 Aug. 4, 2016

(51) Int. Cl.
*G06Q 30/00* (2012.01)
*G06Q 30/02* (2012.01)
*G06F 3/01* (2006.01)
*G06F 3/0482* (2013.01)

(52) U.S. Cl.
CPC ......... *G06Q 30/0242* (2013.01); *G06F 3/013* (2013.01); *G06F 3/0482* (2013.01); *G06Q 30/02* (2013.01); *G06Q 30/0277* (2013.01); *G06F 2203/04806* (2013.01)

(58) Field of Classification Search
CPC . G06Q 30/0277; G06Q 30/0269; G06Q 30/02
USPC ...................................................... 705/14.46
See application file for complete search history.

(56) References Cited

U.S. PATENT DOCUMENTS

| | | | | |
|---|---|---|---|---|
| 3,718,386 A | * | 2/1973 | Lynn et al. | A61B 3/024 351/224 |
| 3,883,235 A | * | 5/1975 | Lynn | A61B 3/024 351/224 |
| 5,689,619 A | * | 11/1997 | Smyth | G02B 27/0093 345/156 |
| 5,731,805 A | | 3/1998 | Tognazzini et al. | |
| 7,116,379 B2 | * | 10/2006 | Suzuki | H04N 5/74 348/747 |
| 7,335,948 B2 | * | 2/2008 | Lotfi | H01L 21/74 257/338 |
| 7,572,008 B2 | | 8/2009 | Elvesjo et al. | |
| 8,285,404 B1 | * | 10/2012 | Kekki | G06F 17/30772 700/94 |
| 9,172,938 B2 | * | 10/2015 | Yoneda | H04N 21/2743 |

(Continued)

OTHER PUBLICATIONS

Kar-Han Tan; Eanbling Geniune Eye Contact and Acurate Gaze in Remote Collaboration,; IEEE Conferences; May 1, 2010; 3rd International Conference on Human Systems Interaction.*

(Continued)

*Primary Examiner* — Luis A Brown
*Assistant Examiner* — Radu Andrei
(74) *Attorney, Agent, or Firm* — Keller Jolley Preece

(57) ABSTRACT

The present disclosure is directed toward tracking visual gaze information. Methods and systems of the present disclosure track a visual gaze of a user with respect to a display of a computing device. In particular, one or more embodiments track a visual gaze of a user with respect to content on a display. The methods and systems can use information about the visual gaze of the user for use in improving the presentation of content. For example, the systems and methods can increase a display size or volume of content in response to the visual gaze of the user. Still further, the methods and systems can use the visual gaze information for providing analytics regarding the viewing habits of the user.

20 Claims, 11 Drawing Sheets

(56) References Cited

U.S. PATENT DOCUMENTS

| | | | | |
|---|---|---|---|---|
| 9,491,374 | B1* | 11/2016 | Avrahami | H04N 5/247 |
| 9,619,695 | B2* | 4/2017 | Tschirhart | G06K 9/00248 |
| 9,652,047 | B2* | 5/2017 | Mullins | G06F 3/017 |
| 9,678,337 | B2* | 6/2017 | Inoue | G02B 27/0075 |
| 9,878,723 | B2* | 1/2018 | Kim | G05D 1/0061 |
| 9,908,048 | B2* | 3/2018 | Osman | A63F 13/213 |
| 2004/0070620 | A1* | 4/2004 | Fujisawa | G09G 3/20 |
| | | | | 715/764 |
| 2005/0073136 | A1* | 4/2005 | Larsson | A61B 3/113 |
| | | | | 280/735 |
| 2009/0315827 | A1* | 12/2009 | Elvesjo | G06F 3/013 |
| | | | | 345/157 |
| 2010/0033333 | A1* | 2/2010 | Victor | A61B 3/113 |
| | | | | 340/576 |
| 2011/0037896 | A1* | 2/2011 | Lin | G06F 3/14 |
| | | | | 348/564 |
| 2011/0081047 | A1* | 4/2011 | Momosaki | G06T 11/60 |
| | | | | 382/103 |
| 2011/0175932 | A1 | 7/2011 | Yu et al. | |
| 2011/0296163 | A1* | 12/2011 | Abernethy | G06F 1/3203 |
| | | | | 713/100 |
| 2012/0084682 | A1* | 4/2012 | Sirpal | G06F 1/1616 |
| | | | | 715/761 |
| 2012/0256967 | A1* | 10/2012 | Baldwin | G06F 3/013 |
| | | | | 345/684 |
| 2012/0300061 | A1* | 11/2012 | Osman | G06F 1/3231 |
| | | | | 348/135 |
| 2013/0293550 | A1* | 11/2013 | Cardno | G06T 13/80 |
| | | | | 345/428 |
| 2013/0314724 | A1* | 11/2013 | Tamura | H04N 1/3875 |
| | | | | 358/1.2 |
| 2013/0335341 | A1* | 12/2013 | Ishibashi | G06F 3/04883 |
| | | | | 345/173 |
| 2014/0002352 | A1* | 1/2014 | Jacob | G06F 3/013 |
| | | | | 345/156 |
| 2014/0013216 | A1* | 1/2014 | Sakuta | G06F 3/0483 |
| | | | | 715/252 |
| 2014/0049462 | A1* | 2/2014 | Weinberger | G06F 3/013 |
| | | | | 345/156 |
| 2014/0078181 | A1* | 3/2014 | Harada | G09G 5/373 |
| | | | | 345/661 |
| 2014/0237366 | A1 | 8/2014 | Poulos et al. | |
| 2014/0347623 | A1* | 11/2014 | Inoue | G02B 27/0075 |
| | | | | 351/159.41 |
| 2014/0361984 | A1* | 12/2014 | Kim | G06F 3/013 |
| | | | | 345/156 |
| 2014/0362202 | A1* | 12/2014 | Tschirhart | G06K 9/00248 |
| | | | | 348/78 |
| 2014/0364212 | A1* | 12/2014 | Osman | A63F 13/213 |
| | | | | 463/31 |
| 2015/0232030 | A1* | 8/2015 | Bongwald | B60R 1/00 |
| | | | | 348/115 |
| 2015/0234457 | A1* | 8/2015 | Kempinski | G06F 3/013 |
| | | | | 345/156 |
| 2015/0301337 | A1* | 10/2015 | Park | G06F 3/013 |
| | | | | 345/8 |
| 2015/0309565 | A1 | 10/2015 | Beri et al. | |
| 2016/0098093 | A1* | 4/2016 | Cheon | G06F 3/0484 |
| | | | | 345/156 |
| 2016/0150950 | A1* | 6/2016 | Yu | A61B 3/0025 |
| | | | | 351/206 |
| 2016/0225012 | A1* | 8/2016 | Ha | G06Q 30/0242 |
| 2016/0246384 | A1* | 8/2016 | Mullins | G06F 3/017 |
| 2017/0163880 | A1* | 6/2017 | Oshima | H04M 11/00 |
| 2017/0190252 | A1* | 7/2017 | Tschirhart | G06K 9/00248 |
| 2017/0212583 | A1* | 7/2017 | Krasadakis | G06F 3/013 |
| 2017/0247041 | A1* | 8/2017 | Kim | G05D 1/0061 |
| 2017/0329325 | A1* | 11/2017 | Hong | B64C 13/20 |
| 2017/0357314 | A1* | 12/2017 | Elvesjo | G06F 3/013 |
| 2018/0115673 | A1* | 4/2018 | Yamasaki | H04N 1/00896 |

OTHER PUBLICATIONS

Shanjun Zhang;Gaze Assitant Eye Tracking and Image Wrapping; 2010 Fifth Conference on Frontier of Computer Science and Technology; Aug. 1, 2010.*

Tobii Eye Tracking—White Paper, An Introduction to Eye Tracking and Tobii Eye Trackers, Jan. 27, 2010, available at http://www.tobii.com/Global/Analysis/Training/WhitePapers/Tobii_EyeTracking_Introduction_WhitePaper.pdf?epslanguage=en.

U.S. Appl. No. 14/263,496, filed Dec. 29, 2016, Preinterview 1st Office Action.

U.S. Appl. No. 14/263,496, filed May 16, 2017, Office Action.

U.S. Appl. No. 14/263,496, filed Oct. 5, 2017, Office Action.

U.S. Appl. No. 14/263,496, filed Jan. 11, 2018, Office Action.

U.S. Appl. No. 14/263,496, filed Oct. 5, 2018, Office Action.

* cited by examiner

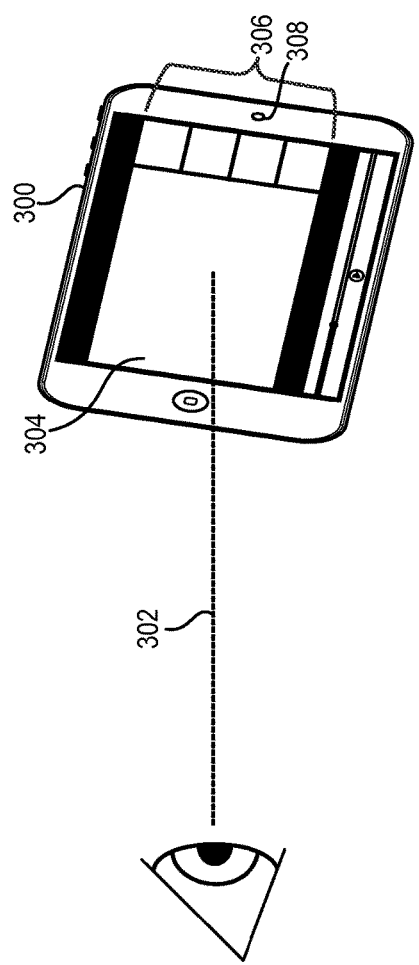
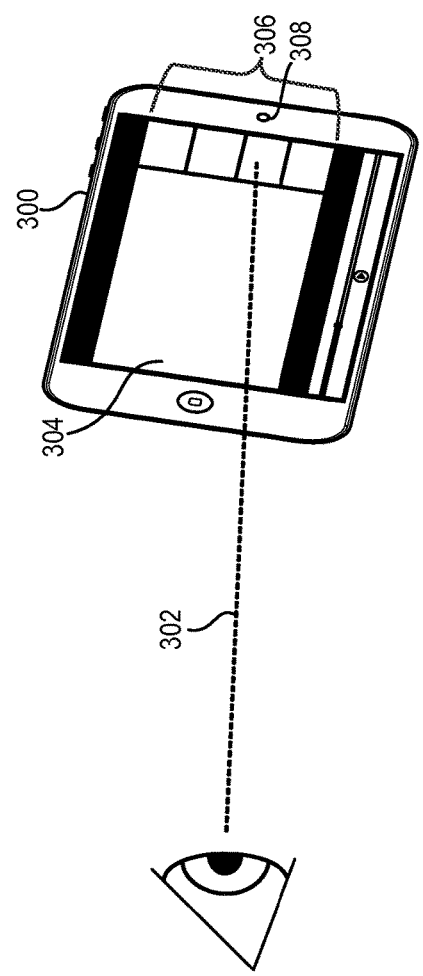

TRACKING VISUAL GAZE INFORMATION FOR CONTROLLING CONTENT DISPLAY

BACKGROUND

1. Technical Field

One or more embodiments described herein relate generally to systems and methods for visual gaze tracking. More specifically, one or more embodiments relate to systems and methods for providing content and analytics based on user visual gaze information.

2. Background and Relevant Art

Content providers and advertisers use tracking information to determine interests of viewers to provide content and advertisements that interests the viewers. Because advertisers provide a major source of revenue for content providers (e.g., television and video streaming content providers), content providers try to provide content that will maintain or increase viewer interest. Increasing viewer interest in content, increases the likelihood that viewers will continue watching during advertisements or from one piece of content to another (e.g., from one show to the next).

Tracking actual viewer interest in a particular content item can be difficult. In particular, many conventional tracking techniques rely on user inputs that do not truly indicate a user interest in the content. For example, conventional tracking techniques that track mouse clicks or touch selections of content or advertisements can be unreliable and deceiving. Mouse clicks and touch selections can be unintentional, and therefore, may not accurately reflect that the user is interested in the content or advertisement. Similarly, set-top boxes that many conventional systems use to determine how many viewers are watching a particular television presentation can only determine whether the television is tuned to a specific channel, but cannot determine whether the viewer is interested in commercials or advertisements presented with the presentation.

Additionally, conventional tracking systems and content providing systems are typically unable to determine how much interest an individual user has in the content. For example, conventional systems can determine that a user has viewed or is viewing a particular content item, but are unable to determine whether the user is very interested, mildly interested, or only has a passing interest in the content item. Thus, while conventional systems can obtain useful information for determining which content and/or advertisements to provide to viewers for maximizing interest, and therefore revenue, many content providers and advertisers may have difficulty providing targeted content and/or advertisements that most likely attract the interest of individual users.

These and other disadvantages may exist with respect to tracking user interests for providing advertisements or content.

SUMMARY

One or more embodiments provide benefits and/or solve one or more of the foregoing or other problems in the art with systems and methods for displaying content based on visual gaze information. For instance, one or more embodiments involve tracking a visual gaze of a user with respect to content on a display. The systems and methods described herein can use information about a visual focus of the user for use in improving the presentation of content to the user and increasing the likelihood that the user remains engaged with the content for longer periods of time. Optionally, the systems and methods can increase a display size or volume of content in response to the visual focus of the user. Still further, the systems and methods can assign an engagement level to a visual focus of the user for providing to an analytics tracking service. For example, one embodiment of a method of tracking visual gaze information for video content involves tracking a visual gaze of a user with respect to a display of a computing device. The method further involves detecting a transition of a visual focus of the user from a first content item in a primary display area of the display to a second content item in a secondary display area of the display. The method further involves determining that the visual focus of the user remains on the second content item for a predetermined time threshold, and then increasing a display size or volume associated with the content item. Thus, the method can emphasize or bring user focus to content in which the user shows interest based on subconscious or passive actions by the user. Another embodiment of a method of tracking visual gaze information for video content involves tracking a visual gaze of a user with respect to a display of a computing device. The method also involves identifying a length of time that a visual focus of the user remains on a first content item. Based on the length of time, the method assigns an engagement level to the visual focus of the user on the first content item. Furthermore, the method involves providing an indication of the engagement level to an analytics tracking service. By providing user engagement information to an analytics tracking service, the method can aid content providers in providing more interesting content to users.

Additional features and advantages of one or more embodiments of the present disclosure will be set forth in the description which follows, and in part will be obvious from the description, or may be learned by the practice of such example embodiments. The features and advantages of such embodiments may be realized and obtained by means of the instruments and combinations particularly pointed out in the appended claims. These and other features will become more fully apparent from the following description and appended claims, or may be learned by the practice of such example embodiments as set forth hereinafter.

BRIEF DESCRIPTION OF THE DRAWINGS

In order to describe the manner in which the above recited and other advantages and features may be obtained, a more particular description of embodiments systems and methods briefly described above will be rendered by reference to specific embodiments thereof that are illustrated in the appended drawings. It should be noted that the Figures are not drawn to scale, and that elements of similar structure or function are generally represented by like reference numerals for illustrative purposes throughout the Figures. Understanding that these drawings depict only typical embodiments and are not therefore to be considered to be limiting of its scope, the systems and methods will be described and explained with additional specificity and detail through the use of the accompanying drawings in which:

FIGS. 3A-3B illustrate diagrams of embodiments of a user visual focus on content displayed on a computing device in accordance with one or more embodiments;

DETAILED DESCRIPTION

Figure 1:
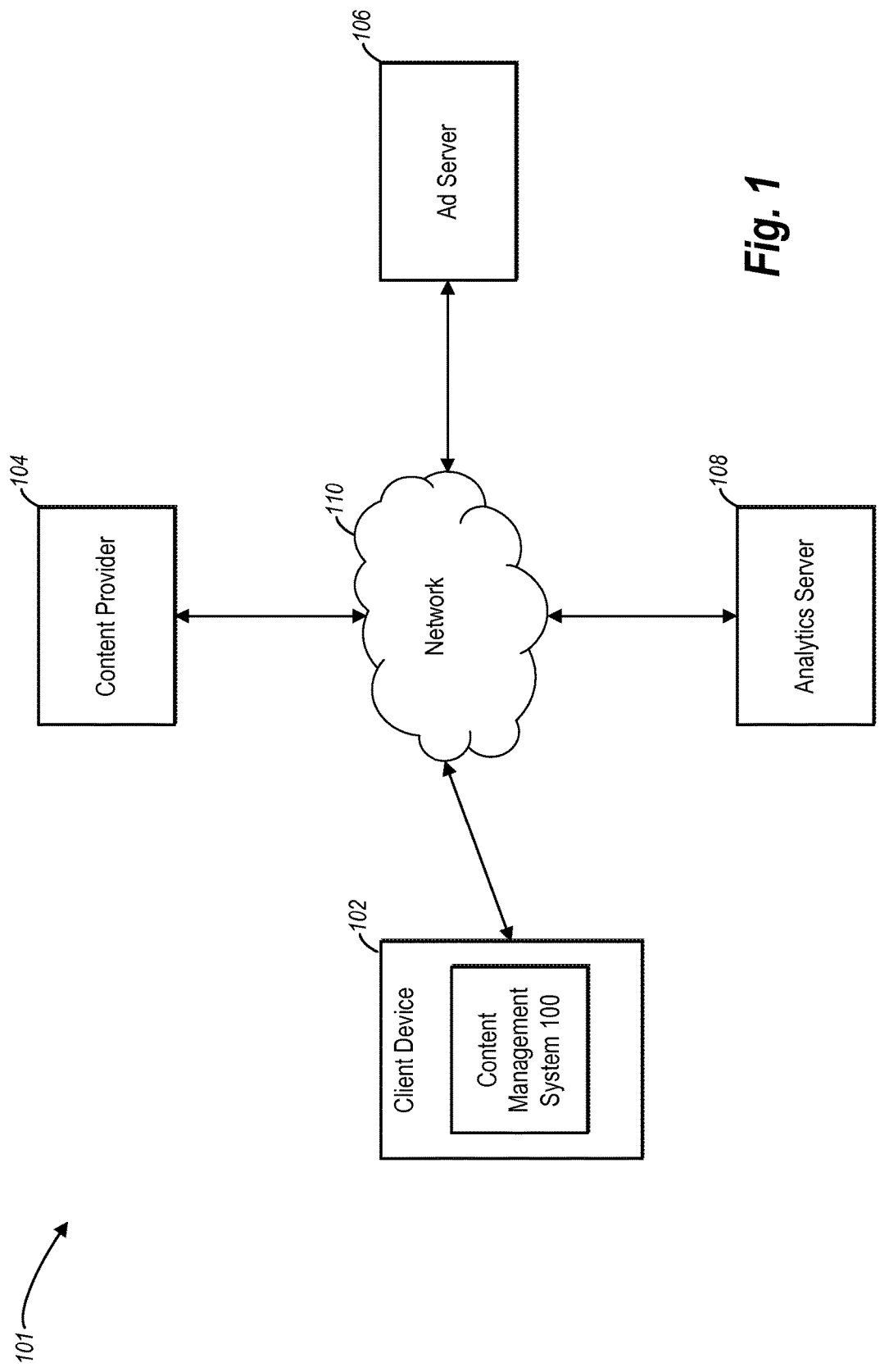
FIG. 1 illustrates a schematic diagram of an environment in which a content management system may be implemented in accordance with one or more embodiments.

The present disclosure is directed towards a content management system that tracks user visual gaze information. In particular, one or more embodiments of the content management system track a visual gaze of a user with respect to content on a display. The content management system can use information about the visual focus of the user for use in improving the presentation of content. For example, the content management system can increase a display size or volume of content in response to the visual focus of the user. Still further, the content management system can use the visual gaze information for providing analytics regarding the viewing habits of the user.

As described in greater detail below, by analyzing and tracking a visual gaze of the user, the content management system can respond to what the user is paying attention to rather than just what the user selects. In other words, when a user looks at content, the content management system can detect this and can emphasize the content automatically without the user explicitly selecting the content. Thus, the content management system can detect and respond to a user's focus rather than solely active selections made by the user.

In one or more embodiments, the content management system can determine which content interests users based on visual gaze tracking information. In particular, the content management system can track the user's visual focus as the user looks at content items on the display. For example, the content management system can determine that the user is interested in a particular content item based on how long the user looks at the content item. Similarly, the content management system can determine that the user is not interested in a particular content item by detecting that the visual focus of the user remains on the content item for a very short period of time (or no time) without returning to the content item. Thus, the content management system can determine a user's interest more accurately, including both purposeful and involuntary or subconscious/passive shifts of focus with respect to content items on a display.

Additionally, the content management system can detect changes in the visual focus of the user. For example, the content management system can detect when the user's gaze shifts from a first content item to a second content item. The system can also determine when the visual focus of the user transitions to additional content items or back to the first content item. Thus, the system can identify which content is most interesting to the user based on how the user's visual focus transitions on the display.

After identifying which content interests the user, the content management system can emphasize the content. Specifically, the content management system can emphasize content in which the user is interested to increase the likelihood that the user will continue viewing the content. For example, the content management system can emphasize the content in a way that may not be distracting or easily recognizable by the user to provide smooth transitions from one content item to another. Emphasizing content items on a display allows the content management system to present interesting content to the user in a timely manner.

According to one or more additional embodiments, the content management system can deemphasize other content items that are not interesting to the user. In particular, when the system determines that the user is viewing a particular content item, the system can modify a size, volume, or other presentation characteristic of other content on the display. By deemphasizing the other content on the display, the system can increase the likelihood that the user's focus will remain on the particular item by reducing or eliminating other distractions (e.g., images or sounds).

In one or more embodiments, the content management system can track visual gaze information for a plurality of users. Specifically, the content management system can use visual gaze information for a plurality of users to provide content in which a consensus of the users are interested. For example, if more users are watching or looking at a particular content item, the content management system can increase the display size or volume of the content item at which the consensus is looking. Alternatively, the content management system can detect the visual focus of more than one group of users and then display multiple content items in a primary display area. Thus, the content management system can emphasize and/or provide content based on the visual gaze information corresponding to a plurality of users.

In addition to the foregoing, the content management system can measure a user's interest in content for analytics or otherwise based on the tracked visual gaze of the user. For example, the content management system can determine whether the visual focus of the user meets more than one threshold. In particular, the system can perform different actions in association with content based on whether the visual focus of the user with respect to the content meets different predetermined thresholds. For example, the system can begin increasing the size of a content item when the visual focus of the user meets a first threshold. The system can also increase the size of the content to fit a primary display area of a display or otherwise change a location of the content when the visual focus meets a second threshold. Additionally, the system can emphasize content in response to determining that the visual focus of the user meets different types of thresholds. Thus, the system can respond to multiple levels or scopes of user interactions with respect to content on the display.

Thus, the content management system can provide more detailed analytics. In particular, by detecting a user's focus, the content management system can determine whether advertisements are actually watched. Similarly, the content management system can detect when users begin becoming bored with content or otherwise ignore (i.e., user looks way or closes their eyes).

In one or more embodiments, the content management system can adapt the presentation of content based on the tracked visual gaze of the user. Specifically, the system can include a machine-learning model that allows the system to improve customize content provided to the user based on collected visual gaze information for the user. For example, if the system collects visual gaze information for a user indicating that the user does look at content that the system emphasizes in a certain way, the system can modify how the system emphasizes the content. By using a machine-learning model to learn tendencies of the user, the system can improve the user's viewing experience.

In addition to the foregoing, the content management system can provide information to analytics tracking services for use in improving content that content providers or advertisers provide to users. For example, the content management system can quantify an interest of a user in a particular content item by assigning an engagement level to the user visual focus. In particular, the content management system can assign the engagement level based on an amount of time that the visual focus of the user remains on a content item or based on other criteria described with respect to the visual focus of the user. The engagement level can be useful to analytics tracking services for understanding what content (e.g., types, genres, visual characteristics, specific items) users find most interesting. The analytics tracking services can then provide the analytics information to content providers and/or advertisers so that the content providers/advertisers can provide more interesting content/advertisements to viewers.

The content management system can track the visual gaze of a user using a camera attached to or incorporated into a computing device displaying content. For example, the camera may use the position of the center of the pupils in combination with infrared or near-infrared light to create corneal reflections while capturing video of the user's eye movements. The content management system can then analyze the positions of the pupils in combination with the corneal reflections to calculate the user's visual focus (e.g., the target or point of regard of the visual gaze) on the display.

As used herein, the term "visual gaze" refers to a direction in which a user is looking with respect to a display device. For example, the system can track a visual gaze of a user to determine a visual focus (or point of regard) of the user as determined by the direction in which a user's eyes are looking or focused. Tracking the visual gaze can include tracking the movements of the user's eyes as the user looks at a display of a computing device (e.g., with an image capturing device). By tracking the movements and/or other attributes of the user's eyes, the system can estimate the interest of a user relative to one or more content items on a display.

As used herein, the term "content item" refers to digital media. Specifically, the content item includes visual media for presentation on a display of a computing device. For example, content items can comprise videos, live television, live sports, music, photos, news, movies, articles, advertisements, etc. A computing device can include a computer monitor, television, tablet, smartphone, or other device that allows a content provider to provide digital media to a user or viewer by way of a digital display.

As used herein, the term "engagement level" refers to the interest of a user based on a visual gaze of the user. For example, the engagement level can include a value assigned to the interest of the user on a scale to represent a relative amount of interest that the user has in a particular content item. Quantifying the interest of the user can help content providers and advertisers provide more interesting content to each user. To illustrate, the engagement level can be based on a time length of the visual focus of the user relative to content, an aggregated length of time of the visual focus of the user relative to content, a number of times that the visual focus of the user returns to content, or other characteristics of the visual focus of the user and/or the content. The engagement level of a user may change over time or from one content item to another content item.

FIG. 1 illustrates a schematic diagram of a system or environment 101 in which a content management system 100 can operate. In one or more embodiments, the system 101 includes a client device 102, a content provider 104, an ad server 106, and an analytics server 108 connected via a network 110. Although the system 101 of FIG. 1 is depicted as having various components, the system 101 may have any number of additional or alternative components (e.g., any number of client devices and/or more than one content provider). For example, more than one component or entity in the system 101 can implement the operations of the content management system 100 described herein. Additionally, or alternatively, the content provider 104, ad server 106, and/or the analytics server 108 may all be part of a single service or system. In alternative embodiments, the client device 102 may access content stored by the content provider 104.

In one or more embodiments, the content provider 104 can store, manage, and provide various types of content. Specifically, the content provider 104 can manage and provide, video, audio, images, articles, and/or other types of content to the client device 102. For example, the content provider 104 can stream one or more types of content to the client device 102. To illustrate, example content providers 104 include cable television providers, television networks, satellite television providers, streaming movie and television providers, streaming music providers, digital magazines, digital news providers, etc.

Additionally, the client device 102 can include a computing device that allows users to access and/or store content for viewing on a display of the computing device. For example, as described previously, the client device 102 can include a smartphone, tablet, desktop computer, laptop computer, smart TV, set-top box, combination of TVs or monitors, or other device that is able to access content from a content provider 104 (e.g., stream content) or from a local storage device for display on one or more displays. The client device 102 may include a client application (e.g., a content player) that enables the playing or viewing of content (including static or streaming content) at the client device 102. The client device 102 may include one or more display devices for displaying content. Further more, the client device 102 can include any of the devices or features discussed below in reference to FIG. 7.

According to one or more embodiments, the content provider 104 can provide content to the client device 102 based on a user account associated with a user of the client device 102. For example, in order to access content from the content provider 104, the client device 102 may authenticate with the content provider 104 using credentials associated with the user account. To illustrate, the client device 102 may allow the user to input the credentials into the client application to login to the user account and access the content from the content provider 104. The content provider 104 can also store user preferences or settings based on the user's viewing habits in association with the user account or the client device 102.

In alternative embodiments, the content provider 104 may authenticate the client device 102 based on unique device information (e.g., a unique device ID) stored at the content provider 104, allowing the user to access content at the client device 102 without requiring the user to enter credentials. For example, a cable or satellite provider can maintain a database of device IDs that the content provider 104 gives to users, such that when the client device 102 is turned on, the content provider 104 can match the device ID of the client device 102 to the database. If the content provider 104 finds the device ID in the database, the content provider 104 can provide content to the client device 102.

In one or more implementations, the content provider 104 can provide more than one content item to the client device 102 at a time. For example, the content provider 104 can provide a plurality of content streams for displaying simultaneously on the client device 102. To illustrate, the client device 102 can receive more than one content stream from the content provider 104 and display each of the streams in a different display area on a display of the client device 102. Alternatively, the client device 102 can display each of the streams on a different display device associated with the client device 102.

The system 100 can also include an ad server 106 that provides advertisements to the client device 102. In one or more embodiments, the ad server 106 can work in conjunction with the content provider 104 to provide advertisements with streaming or broadcasted content to the client device 102. For example, while the content provider 104 provides streaming content to the client device 102, the ad server 106 can provide advertisements to the client device 102 with the streaming content. To illustrate, the content provider 104 can provide advertisements with each content item streaming to the client device 102. Thus, the client device 102 may potentially display advertisements in more than one display area of the display.

In one or more embodiments, the system 100 can include an analytics server 108 for providing analytics about the user's viewing habits to the ad server 106 and/or the content provider 104. Specifically, the client device 102 can send information to the analytics server 108 including information about the user's engagement with content to allow the analytics server 108 to determine what kind of content interests the user. For example, the information that the client device 102 sends to the analytics server 108 can include the types of content that the user views, the user's engagement level associated with particular content items, visual gaze information, and/or other information that allows the analytics server 108 to determine which content interests the user.

The content provider 104 and/or ad server 106 can select content to provide to the user based on the information from the analytics server 108. For example, the content provider 104 and the ad server 106 can determine which content to provide based on information from the analytics server 108 indicating that the user of the client device 102 is interested in a particular content item or type of content. To illustrate, if the analytics server 108 determines that the visual gaze information associated with the user indicates that the user is very interested in a particular content item, the content provider 104 and/or the ad server 106 can provide content that is similar to the identified content item. Alternatively, the visual gaze information can indicate that the user is not at all interested in a content item, and the content provider 104 and/or the ad server 106 can provide fewer or no content items similar to the identified content item.

Figure 2:
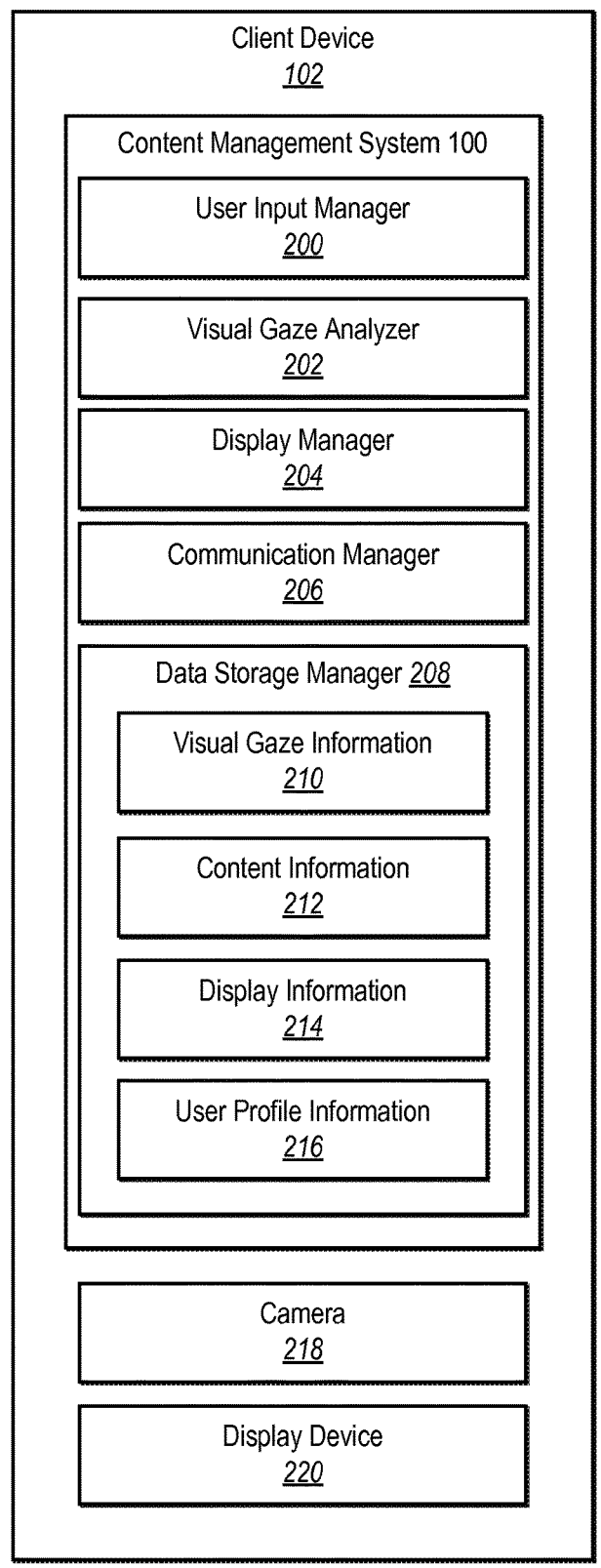
FIG. 2 illustrates a schematic diagram the content management system of FIG. 1 in accordance with one or more embodiments.

FIG. 2 illustrates a schematic diagram of one or more embodiments of the client device 102 of FIG. 1. As shown the client device 102 can implement the content management system 100. The content management system 100 may include, but is not limited to, a user input manager 200, a visual gaze analyzer 202, a display manager 204, a communication manager 206, and a data storage manager 208. Each of the components of the content management system 100 can be in communication with one another using any suitable communication technologies. It will be recognized that although the components of the content management system 100 are shown to be separate in FIG. 2, any of the components may be combined into fewer components, such as into a single component, or divided into more components as may serve a particular implementation. Although the components of FIG. 2 are described in connection with the client device 102, at least some of the components for performing operations in conjunction with the content management system 100 described herein may be implemented on other devices within the system 101, such as on the content provider 104, ad server 106, or analytics server 108.

The components 200-208 can comprise software, hardware, or both. For example, the components 200-208 can comprise one or more instructions stored on a computer-readable storage medium and executable by processors of one or more computing devices (e.g., the client device 102 or devices in communication with the client device 102). When executed by the one or more processors, the computer-executable instructions of the content management system 100 can cause the computing device(s) to perform the automation methods described herein. Alternatively, the components 200-208 can comprise hardware, such as a special purpose processing device to perform a certain function or group of functions. Additionally or alternatively, the components 200-208 can comprise a combination of computer-executable instructions and hardware.

Furthermore, the components 200-208 of the content management system 100 performing the functions described herein with respect to the content management system 100 may, for example, be implemented as a stand-alone application, as a module of an application, as a plug-in for applications including image processing applications, as a library function or functions that may be called by other applications such as image processing applications, and/or as a cloud-computing model. Thus, the components of the content management system 100 may be implemented as a stand-alone application, such as a personal computer or mobile application (e.g., an application running on a personal computing device). Alternatively or additionally, the components of the content management system 100 may be implemented in any application that allows users to view content, including but not limited to ADOBE PRIMETIME. "ADOBE" and "ADOBE PRIMETIME" are registered trademarks of Adobe Systems Incorporated in the United States and/or other countries.

As mentioned above, the content management system 100 can include a user input manager 200. In one or more embodiments, the user input manager 200 can manage one or more user inputs to the client device 102. Specifically, the user input manager 200 can include components for receiving and interpreting user inputs to the client device 102. For example, the user input manager 200 can detect when a user interacts with a user input device to perform one or more operations within an operating system or client application of the client device 102. To illustrate, the user input manager 200 can receive user inputs from a user input device, including, but not limited to, a mouse, keyboard, touch pad, touchscreen, stylus, or camera. The user input manager 200 can also communicate with other components within the client device 102 to store and/or use user input data from the user input devices.

Additionally, the user input manager 200 can include a visual gaze tracker that facilitates the tracking of user input relating to the visual gaze of the user. In particular, the visual gaze tracker can track the motion of the user's eyes for determining a direction in which the user is looking. As mentioned, the user input may provide user input to the client device 102 by way of a camera 218 to capture video of the user. Capturing video of the user allows the visual gaze tracker to track movements of the user's eyes, including movements, dilation, and other characteristics of the user's pupils, etc. The visual gaze tracker can communicate with the data storage manager 208 to store visual gaze information 210 for use by other components at the client device 102 or at one of the other components in the content management system 100.

According to one or more embodiments, the content management system 100 includes a visual gaze analyzer 202 to determine a visual focus of the user. Specifically, the visual gaze analyzer 202 uses the visual gaze information 210 from the visual gaze tracker to determine the visual focus of the user. The visual focus of the user can indicate to the content management system 100 whether the user is looking at a particular content item or whether the user is even looking at the display device 200 of the client device 102 based on a direction of the visual gaze. Additionally, the visual gaze analyzer 202 can determine additional details about the visual focus of the user based on additional characteristics of the user's visual gaze, including intensity of focus, number of times the user looks at a particular content item or length of time (continuous or aggregated) that the user looks at a particular content item.

As mentioned, the content management system 100 can include a display manager 204. The display manager 204 can manage the content on the display device 220 by determining where and how to display the content. In particular, the display manager 204 can communicate with the visual gaze analyzer 202 to determine which content interests the user for highlighting or otherwise emphasizing the content in which the user is interested. For example, after determining that the user is interested in a particular content item, the display manager 204 can emphasize the identified content item by modifying one or more visual attributes of the content item. Additionally, or alternatively, the display manager 204 can modify other attributes associated with the presentation of content, such as a volume associated with the content item.

In one or more embodiments, the content management system 100 can include a communication manager 206 to facilitate communications between components within the content management system 100 and/or between components in the client device 102 and other components or devices in the system 101. Specifically, the communication manager 206 can facilitate communication between the user input manager 200, the visual gaze analyzer 202, and/or the display manager 204 and one or more of the content provider 104, the ad server 106 and the analytics server 108. For example, after the visual gaze analyzer 202 determines that the user is interested in a particular content item, the communication manager 206 can facilitate communication between the visual gaze analyzer 202 and the analytics server 108. After the analytics server 108 sends information to the content provider 104, the communication manager 206 can facilitate communication between the display manager 204 and the content provider 104 to provide content based on analytics information obtained by the visual gaze analyzer 202.

As described above, the content management system 100 can include a data storage manager 208 to facilitate storage of information for the client device 102 and/or for the content management system 100. In particular, the data storage manager 208 can store information used by one or more of the components for the content management system 100 to facilitate the performance of various operations associated with tracking visual gaze information 210 and providing content to the client device 102. In one or more embodiments as shown in FIG. 2, the data storage manager 208 maintains visual gaze information 210, content information 212, display information 214, and user profile information 216. The data storage manager 208 may also store additional or alternative information corresponding to the operation of the client device 102 or the content management system 100. The data storage manager 208 can maintain additional or alternative data as may serve a particular implementation. The data storage manager 208 may communicate with components within the client device 102 to obtain or share information for tracking visual gaze information 210 and providing content to a user of the client device 102. In one or more alternative embodiments, the data storage manager 208 can include one or more remote servers on which various types of data are stored. For example, the data storage manager 208 may include or may be implemented in a data storage environment accessible to the client device 102, such as a cloud storage system, for obtaining and storing data associated with operations within the content management system 100.

In one or more embodiments, the visual gaze information 210 can include data representing a position of the user's eyes. Specifically, the visual gaze information 210 allows the content management system 100 to determine where the user is looking based on the position and motion of the user's eyes. As the user's eyes transition from one content item to another, or if the user's eyes remain on the same content item, the content management system 100 can track and store the position and motion information for use in determining where the user is looking.

Visual gaze information 210 can also include information about the irises of the user's eyes. For example, the content management system 100 can identify certain attributes of the pupils to determine where the user is looking (e.g., position of the irises and/or whites of the eyes) and how interested the user may be in a particular content item. The visual gaze information 210 can also include information about the visual focus of the user that may allow the system 100 to determine how interested the user is in a particular content item (e.g., based on the dilation of the user's irises). For example, dilated pupils may indicate that the user is especially interested in a particular content item. Similarly, constricted pupils may indicate a lack of interest in a content item.

According to one or more embodiments, the content information 212 can include data representing information about content displayed on a display device 220 of the client device 102. In particular, the content information 212 can represent information about content currently being displayed or previously displayed at the client device 102. For example, the content information 212 can include genre information, a content type (e.g., advertisement, serial show, movie), a content identifier indicating the exact content item, content items related to or similar to the content items currently or previously displayed.

In one or more embodiments, the display information 214 can include data that represents information about one or more displays of a computing device. Specifically, the display information 214 can include information about one or more display devices associated with the client device 102 and/or display areas in the display device(s). To illustrate, the display information 214 can include location information used for displaying content on the display devices. For example, the display information 214 can describe the exact location, size, shape, and/or other display characteristics associated with the content.

In one or more additional embodiments, the display information 214 can include or be associated with additional information associated with presenting content at the client device 102. In particular, the display information 214 can include or be associated with audio information that corresponds to the content. For example, the audio information can include volume levels for playing audio associated with the content while displaying the content at the client device 102. Additionally, or alternatively, the display information 214 can include additional metadata describing the client device 102 that may be useful to the client device 102, content provider 104, and/or ad server 106.

According to one or more embodiments, the user profile information 216 can include data representing information about the user. Specifically, the user profile information 216 can include data that describes the user, the user's interests, the user's preferences, or other characteristics of the user that may affect the content displayed at the client device 102. For example, the user profile information 216 can include information that the client device 102 and/or content management system 100 may collect about the user in response to user interactions with the content. To illustrate, the user profile information 216 can include information that the user may set personal preferences for what content the client device 102 displays, how the client device 102 displays the content, and/or how the user interactions with the client device 102 affect the displayed content. Additionally, or alternatively, the user profile information 216 can include information that the content management system 100 has collected as part of a machine-learning model to identify the user's viewing habits and predicted user interactions.

Although the data storage manager 208 in FIG. 2 is described to include the visual gaze information 210, the content information 212, the display information 214, and the user profile information 216, the data storage manager 208 can include additional or alternative information related to the client device 102 and/or the content management system 100, as previously mentioned. Additionally, the data storage manager 208 can include information for other types of systems and processes. For example, the data storage manager 208 can manage or communicate with a distributed storage space configured to interface with one or more devices or systems in addition to the client device 102 and/or content management system 100, allowing the different devices/systems to interact with one another.

As previously mentioned, a user's visual gaze can provide information that is useful in identifying content that interests the user. Tracking the visual gaze of the user can indicate where the user is looking and how interested the user is in a particular content item. FIGS. 3A-3B illustrate diagrams of a user visual focus 302 determined using the visual gaze information associated with the user. Specifically, FIGS. 3A-3B illustrate detecting a visual focus 302 of a user with respect to one or more content items displayed on a display device 301 of a client device 300. The client device 300 comprises a tablet computing-device and is one example of a client device 102 describe above.

When the user operates the client application on the client device 300, the client device 300 may display one or more content items. Specifically, the client device 300 can display at least two content items on the display device 301 at the same time (e.g., in a video wall containing thumbnails, live video, or combination of thumbnails and videos). For example, the client device 300 may display a first content item in a primary display area 304 of the display device 301 of the client device 300, and one or more additional content items in one or more secondary display areas 306 of the display device 301. Alternatively, the client device 300 may display a plurality of display areas that have the same area/size in different locations of the display device 301.

In one or more embodiments, the first content item may be streaming content (e.g., a television show, movie or commercial advertisement) in the primary display area 304, and the one or more additional content items (e.g., one or more television shows, movies or commercial advertisements) may also be streaming content in the secondary display areas 306. Alternatively, one or more of the content items may be static images, such as descriptive image tiles associated with streaming content (e.g., a "channel" icon), pictures (e.g., photos or picture advertisements), or other content items that may grab the user's attention. In additional or alternative embodiments, one or more of the content items may be a content item associated with a particular music station or song, including an album cover or a music video.

In one or more embodiments, the primary display area 304 of the display device 301 may be a main display area that is larger than other display areas in the display device 301. In particular, the primary display area 304 of the display may display a currently selected or currently viewed content item. For example, content in the primary display area 304 may be larger than other content items or may be in a central area of the display of the computing device to draw the user's attention to the content item and allow the user to view the content item more easily. Additionally, the client device 300 may also play audio associated with the content item in the primary display area 304. To illustrate, if the user is watching a television show in the primary display area 304 of the display, the client device 300 may also play audio corresponding to the television show.

In one or more additional embodiments, one or more secondary display areas 306 of the display may be smaller than the primary display area 304. For example, the display may include one or more small secondary display areas 306 to one or both sides of the primary display area 304. Each of the secondary display areas 306 may be smaller than the primary display area 304 to allow the primary display area 304 to take up most of the space on the display. Alternatively, the secondary display areas 306 may merely be positioned at the edge of the screen so that the primary display area 304 is positioned in a central area of the display, regardless of the size of each of the secondary display areas 306. In various implementations, the secondary display areas 306 may have uniform sizes or different sizes.

As shown in FIG. 3A, the visual focus 302 of the user (represented by the dashed line) is on the first content item displayed in the primary display area 304 of the display. The visual focus 302 of the user may be on the first content item in the primary display area 304 while the user is watching or otherwise viewing the first content item. For example, as mentioned, the user may be watching a television show in the primary display area 304, such that the visual focus 302 of the user is on the primary display area 304 while the user watches the television show.

In one or more embodiments, the client device 300 can track the visual gaze of the user for use in identifying the user's visual focus 302. Specifically, the client device 300 can capture images of the user and use image processing techniques to track the user's visual gaze and determine the visual focus 302 of the user. For example, the client device 300 can include a camera 308 or other image capture device to capture images of the user while the user is operating the client device 300. To illustrate, as the user views content on the display, the camera 308 can continuously capture video of the user to track eye movements of the user. Alternatively, the camera 308 can capture video or images intermittently or periodically to save battery life, energy usage or for other purposes.

In at least one implementation, the camera 308 can activate for continuous capture whenever the client application is open and/or in use. Thus, whenever the client application is open or in use, the camera 308 can actively track the user's eye movements. If the user closes the client application or turns off the client device 300, the camera 308 may deactivate and stop tracking the user's eye movements. Alternatively, the capture device may be always on and tracking the user's eye movements, even when the display of the client device 300 is off. For example, an "always on" camera 308 can be useful in tracking other user movements in association with the client device 300.

As mentioned, the content management system 100 can also analyze the visual gaze information to determine the visual focus 302 of the user. Specifically, the content management system 100 may use image-processing techniques for determining where the user is looking on the display. For example, the content management system 100 can use the techniques described in Tobii Eye Tracking—White Paper, An Introduction to Eye Tracking and Tobii Eye Trackers, Jan. 27, 2010, available at http://www.tobii.com/Global/Analysis/Training/WhitePapers/Tobii_EyeTracking_Introduction_WhitePaper.pdf?epslanguage=en or U.S. Pat. No. 7,572,008, each of which are incorporated by reference here in their entirety. According to one non-limiting example, the content management system 100 can analyze video of the user's eye movements to determine the position of the pupils relative to each other or to movements of the user's head. To illustrate, the camera 308 may use the position of the center of the pupils in combination with infrared or near-infrared light to create corneal reflections while capturing video of the user's eye movements. The content management system 100 can then analyze the positions of the pupils in combination with the corneal reflections to calculate the user's visual focus 302 (e.g., the target or point of regard of the visual gaze) on the display. More specifically, the content management system 100 can use Pupil Centre Corneal Reflection (PCCR). For example, the content management system 100 can use a light source (e.g., light of the display screen or the flash of the camera 308) to illuminate the eye of the user causing highly visible reflections. The camera 308 can then capture an image of the eye showing these reflections. The image captured by the camera 308 is then used to identify the reflection of the light source on the cornea (glint) and in the pupil. Then the content management system 100 calculates a vector formed by the angle between the cornea and pupil reflections—the direction of this vector, combined with other geometrical features of the reflections, will then be used to calculate the gaze direction.

Additionally, after identifying the visual focus 302 of the user, the content management system 100 can determine that the visual focus 302 of the user corresponds to a particular content item. Specifically, the content management system 100 can map physical locations on the display of the client device 300 to content items based on the corresponding display areas of the content items. In response to determining the physical location on the display corresponding to the visual focus 302 of the user, the content management system 100 can determine which content item is mapped to the identified physical location. To illustrate, in FIG. 3A, the content management system 100 determine that the visual focus 302 of the user is on the primary display area 304 of the display. As such, the content management system 100 can determine that the visual focus 302 of the user is on the first content item displayed in the primary display area 304.

In one or more embodiments, the display of the client device 300 may be separated into a grid based on the position and number of the display areas for mapping content to the display. In particular, the content management system 100 may divide the display into blocks that correspond to the primary display area 304 and the one or more secondary display areas 306. For example, if the display includes a primary display area 304 and four secondary display areas 306, the content management system 100 can divide the display into five blocks, each of which corresponds to the primary display area 304 or one of the four secondary display areas 306. Thus, each of the grid blocks may have a size equal to a corresponding display area. In alternative embodiments, the display may include a large number of small grid blocks, each having the same size, such that the client device 300 may be able to determine the location of the focus of the user with a higher granularity. Alternatively, the grid blocks can have different sizes and shapes.

In one or more alternative embodiments, the client device 300 can include a plurality of grid blocks corresponding to different physical locations of the display. Specifically, the client device 300 can include grid blocks mapped to physical locations of the display that the client device 300 can also map to display areas based on the locations of the display areas. For example, while the location of display areas on the display may change (e.g., due to a different layout or arrangement of display areas), the grid blocks may stay the same. Thus, if the positions of the display areas change, the content management system 100 can map the display areas to the grid blocks for the corresponding physical locations.

According to one or more embodiments, if the is looking near or at a boundary of one or more of the display areas, the content management system 100 may determine that the visual focus 302 of the user is at the boundary. For cases in which the visual focus 302 of the user is near or at the boundary, or in response to being unable to determine whether the visual focus 302 of the user is on a particular display area, the content management system 100 can include a buffer region. Specifically, if the visual focus 302 of the user is within the buffer region, the content management system 100 may treat the visual focus 302 of the user as being in the primary display area 304. For example, if the user is looking at either the primary display area 304 or one of the secondary display areas 306, but the content management system 100 determines that the visual focus 302 of the user is within the buffer region (e.g., on either side of the boundary between the primary display area 304 and a particular secondary display area), the content management system 100 may treat the visual focus 302 of the user as being within the primary display area 304. Alternatively, the content management system 100 may be able to accurately determine where the user is looking, even if the user is looking at or near the boundary between two or more display areas.

In one or more embodiments, the user or manufacturer may calibrate the camera 308, the client device 300, and/or content management system 100 to verify that the identified visual focus 302 of the user actually corresponds to a physical area of the display (and the corresponding content item). Calibrating the camera 308, client device 300, and/or content management system 100 can improve the accuracy in determining the visual focus 302 of the user relative to the content on the display. For example, the content management system 100 may display a request to the user to select a point on the display to indicate where the user is looking, allowing the content management system 100 to compare the selected point with a calculated point on the display. The content management system 100 may make adjustments to the camera 308, the client device 300, and/or the content management system 100 to capture, interpret or otherwise analyze image capture data from the camera 308 to accurately determine the visual focus 302 of the user. In additional or alternative embodiments, the camera 308, the client device 300, and/or the content management system 100 may include a default calibration.

The content management system 100 can also detect when the visual focus 302 of the user transitions from one content item to another content item. FIG. 3B illustrates that the visual focus 302 of the user has transitioned from the first content item in the primary display area 304 to a second content item in one of the secondary display areas 306. Specifically, FIG. 3B shows that the secondary display areas 306 each include a much small area on the display to the side of the primary display area 304. In one or more alternative embodiments, the display may include secondary display areas 306 on both sides of the primary display area 304, above the primary display area 304, and/or below the primary display area 304. In additional, or alternative, embodiments, one or more secondary display areas 306 may be located on a separate display device than the primary display area 304.

When the visual focus 302 of the user transitions from the primary display area 304 to a secondary display area 306, the camera 308 can capture video of the user's eye movements, and the content management system 100 can analyze the captured video to detect the transition from the primary display area 304 to the secondary display area. In particular, the content management system 100 can analyze the video to determine that the centers of the user's pupils are directed toward the secondary display area, rather than the primary display area 304. For example, the content management system 100 can determine that the visual focus 302 of the user transitions from a grid block corresponding to the primary display area 304 to a grid block corresponding to the secondary display area 306. Thus, the content management system 100 can determine that the visual focus 302 of the user is now on the second content item corresponding to the secondary display area.

In one or more additional embodiments, the content management system 100 can detect a plurality of transitions of the visual focus 302 of the user among a plurality of content items in the display. For example, the content management system 100 can detect that the visual focus 302 of the user transitions from the first content item to the second content item, and then transitions to a third content item in another secondary display area. Alternatively, the content management system 100 can detect that the visual focus 302 of the user transitions from the first content item to the second content item, and then transitions back to the first content item.

In addition to detecting the position of the visual focus 302 of the user, the content management system 100 can determine a length of time associated with the visual focus 302 of the user relative to each content item. Specifically, the content management system 100 can track the length of time that the visual focus 302 of the user remains on each content item. For example, the content management system 100 can determine that the visual focus 302 of the user remains on the first content item for a first length of time. After the visual focus 302 of the user transitions to the second content item, the content management system 100 can determine that the visual focus 302 of the user remains on the second content item for a second length of time.

Furthermore, the content management system 100 can track the total length of time that the visual focus 302 of the user remains on a particular content item. For example, as the visual focus 302 of the user changes from one content item to another, the content management system 100 can maintain an aggregate length of time that the visual focus 302 of the user is on a particular content item. To illustrate, if the visual focus 302 of the user transitions from the first content item to the second content item, the content management system 100 can detect that the visual focus 302 of the user was on the second content item for a first length of time. If the visual focus 302 of the user transitions back to the first content item, and then again to the second content item, the content management system 100 can detect that the visual focus 302 of the user was on the second content item for a second length of time. The content management system 100 can calculate a total or aggregated length of time that the visual focus 302 of the user was on the second content item by adding the first length of time to the second length of time.

In one or more embodiments, the content management system 100 can calculate the aggregated length of time for the visual focus 302 of the user relative to a particular content item within a predetermined time period. In particular, the content management system 100 may set the predetermined threshold to determine whether the aggregated length of time for the visual focus 302 of the user relative to the particular content item meets or exceeds a predetermined time threshold. For example, the content management system 100 can determine whether the aggregated length of time for the visual focus 302 of the user relative to the second content item meets a predetermined threshold within a predetermined time period (e.g., 5 seconds, 10 seconds, a minute) to determine whether to perform operations associated with the second content item. The content management system 100 can continuously update the aggregated length of time to determine whether the aggregated length of time meets the predetermined threshold within a time window equal to the predetermined time period.

Additional embodiments may allow the content management system 100 to display or hide the secondary display areas 306 based on the visual gaze information. For example, if the user looks away from the display for a predetermined amount of time, the content management system 100 may determine that the user is disinterested in the content currently shown on the display. The content management system 100 can then show the secondary display areas 306 with additional content items in an attempt to show the user something else that may interest the user. Similarly, if the user has looked at the content in the primary display area 304 without looking away for a certain amount of time, the content management system 100 may hide the secondary display areas 306.

According to one or more embodiments, the content management system 100 can perform an operation associated with a particular content item based on whether the visual focus 302 of the user remains on the content item for a predetermined time threshold. Specifically, the content management system 100 can emphasize the content item in response to determining that the visual focus 302 of the user remains on the particular content item for the predetermined time threshold. For instance, if the visual focus 302 of the user meets the predetermined time threshold, the content management system 100 can determine that the user is interested in the content item. The content management system 100 can then increase the size of the content item or increase the volume associated with the content item, as described in more detail below with reference to FIGS. 4A-4E.

As mentioned, the predetermined threshold can be a time threshold for determining whether the visual focus 302 of the user is on a content item for a length of time meeting the time threshold. In additional, or alternative, embodiments, the predetermined threshold may be a positional threshold based on the location of the visual focus 302 of the user relative to one or more display areas of the display. For example, the content management system 100 may determine whether the visual focus 302 of the user has traveled a certain distance within a display area or has reached a specific location within the display area. Other embodiments may include other types of thresholds, such as movement thresholds, thresholds involving a number of times the viewer looks at (or away from) one or more content items, or thresholds based on content types or attributes.

Additionally, or alternatively, the content management system 100 can use more than one threshold for determining certain characteristics of the visual focus 302 of the user and/or for determining whether to perform one or more operations associated with the content on the display. For example, the content management system 100 can assign an engagement level to the visual focus 302 of the user relative to the second content item based on the length of time that the visual focus 302 of the user remains on the second content item (e.g., contiguous length of time or aggregated length of time). If the length of time meets a first threshold, the content management system 100 can assign a first engagement level to the visual focus 302 of the user. If the length of time meets a second threshold, the content management system 100 can assign a second engagement level to the visual focus 302 of the user. The content management system 100 may use a number of thresholds based on the number of engagement levels.

According to one or more embodiments, the content management system 100 can determine the engagement level of the visual focus 302 of the user based on attributes of the pupil. Specifically, the content management system 100 can track and analyze the pupils to detect changes in the dilation of the user's pupils while viewing one or more content items. To illustrate, the content management system 100 can determine that the user is interested in the second content item in response to detecting that the user's pupils dilate while looking at the second content item. Alternatively, the content management system 100 can determine that the user is not interested in the second content item in response to detecting that the user's pupils constrict while looking at the second content item.

In one or more embodiments, the content management system 100 can also use the visual gaze information to provide relevant content to the user. For example, the content management system 100 can send the visual gaze information, or an indication of the engagement level derived from the visual gaze information, to the analytics server 108 to analyze the visual gaze information and determine interests for the user. To illustrate, the analytics server 108 can determine that the user is highly interested in content similar to the second content item if the indication of the engagement level represents a high interest in the second content item.

The content management system 100 or the analytics server 108 can also identify one or more characteristics of the second content item. In one or more embodiments, the analytics server 108 can provide information about the user's interests and the one or more characteristics of the second content item to the content provider 104 and/or the ad server 106. The content provider 104 and/or the ad server 106 can provide content related to the second content item (e.g., including the identified characteristic) to the client device 300. Similarly, the content management system 100 or the analytics server 108 can identify a common characteristic associated with a plurality of content items that interest the user based on visual gaze information for the user (e.g., based on transitions of the visual focus 302 of the user among content items). The content provider 104 and/or ad server 106 can provide one or more new content items that include the identified common characteristic. By increasing the amount of content that interests the user, the content provider 104 and/or the ad server 106 can increase the likelihood that the user will view the provided content.

Alternatively, the content management system 100 can determine that the user is not interested in content similar to the second content item if the indication of the engagement level represents a low interest or no interest in the second content item. To illustrate, if the content management system 100 determines that the engagement level of the user represents a low interest in the second content item, the content management system 100 can provide such information to the content provider 104 and/or the ad server 106. The content provider 104 and/or ad server 106 can then provide a reduced amount of content similar to the second content item or stop providing content similar to the second content item to the client device 300. Thus, the content provider 104 and/or the ad server 106 can also increase the likelihood that the user will be interested in content by reducing the amount of content that does not interest the user.

In one or more embodiments, the content management system 100 can send information to the analytics server 108 about the content item that may indicate a user interest in the content item. For example, the content management system 100 can determine a user interest based on an amount of time that the user viewed the content item. To illustrate, if the user only viewed a portion of an advertisement, the content management system 100 can send the viewing time/percentage to the analytics server 108, which can then notify the ad server 106 of the user's interest in the particular advertisement. The ad server 106 may use such information to provide content that may generate more interest from the user of the client device 300.

In one or more additional or alternative embodiments, the content management system 100 can track eye movements for a plurality of users. Specifically, the content management system 100 may include one or more cameras 308 that can capture images or video of more than one user to determine where the visual focus of each user is located on one or more displays of the client device 300. For example, using facial recognition and other image processing techniques, the content management system 100 can identify each pair of eyes as belonging to a separate user. The content management system 100 can track the movements of each pair of eyes to determine where each user is looking relative to content on the one or more displays of the client device 300. In some implementations, the content management system 100 may select only one user for determining which content to provide/emphasize.

After identifying a location of the visual focus of each of the plurality of users, the content management system 100 can determine that the visual focus of a consensus of the plurality of users is on a particular content item. When determining where the visual focus of the consensus is located, the content management system 100 may determine the location of the visual focus of each user relative to the grid corresponding to the display. For example, the content management system 100 can determine that the visual focus of the consensus is on the second content item based on an analysis of the visual gaze of all of the users relative to the grid blocks corresponding to each content item. Accordingly, the content management system 100 may emphasize the second content item and/or perform one or more operations associated with the second content item based on the determination that the visual focus of the consensus is on the second content item. As one may appreciate, the visual focus of each user may be in a different location within one or more of the grid blocks.

Additionally, or alternatively, the content management system 100 may track visual gazes of groups of users. In particular, the content management system 100 may determine that different groups of users are looking at different content items on one or more displays of the client device 300. For example, the content management system 100 may determine that the visual focus of a first group of users is on the first content item and the visual focus of a second group of users is on the second content item. To illustrate, the content management system 100 can determine that the visual focus of the first group of users is on the first content item by detecting the visual focus of each user in the first group of users in a grid block corresponding to the primary display area 304. Similarly, the content management system 100 can determine that the visual focus of the second group of users is on the second content item by detecting the visual focus of each of the second group of users in a grid block corresponding to the secondary display area. The content management system 100 can then emphasize the first content item and the second content item and/or perform one or more operations associated with the first content item and the second content item based on the determination that the visual focus of the first group is on the first content item and the determination that the visual focus of the second group is on the second content item.

As previously mentioned, the content management system 100 can emphasize or modify content or display areas on the display of the client device 300 in accordance with visual gaze information for the user. FIGS. 4A-4E illustrate user interfaces for displaying a plurality of content items in various display areas of the display of a client device 400. Specifically, the content management system 100 can modify the way content appears on the display, where each content item is located, and/or other attributes associated with the content items or display areas based on the visual focus of the user.

Figure 4A:
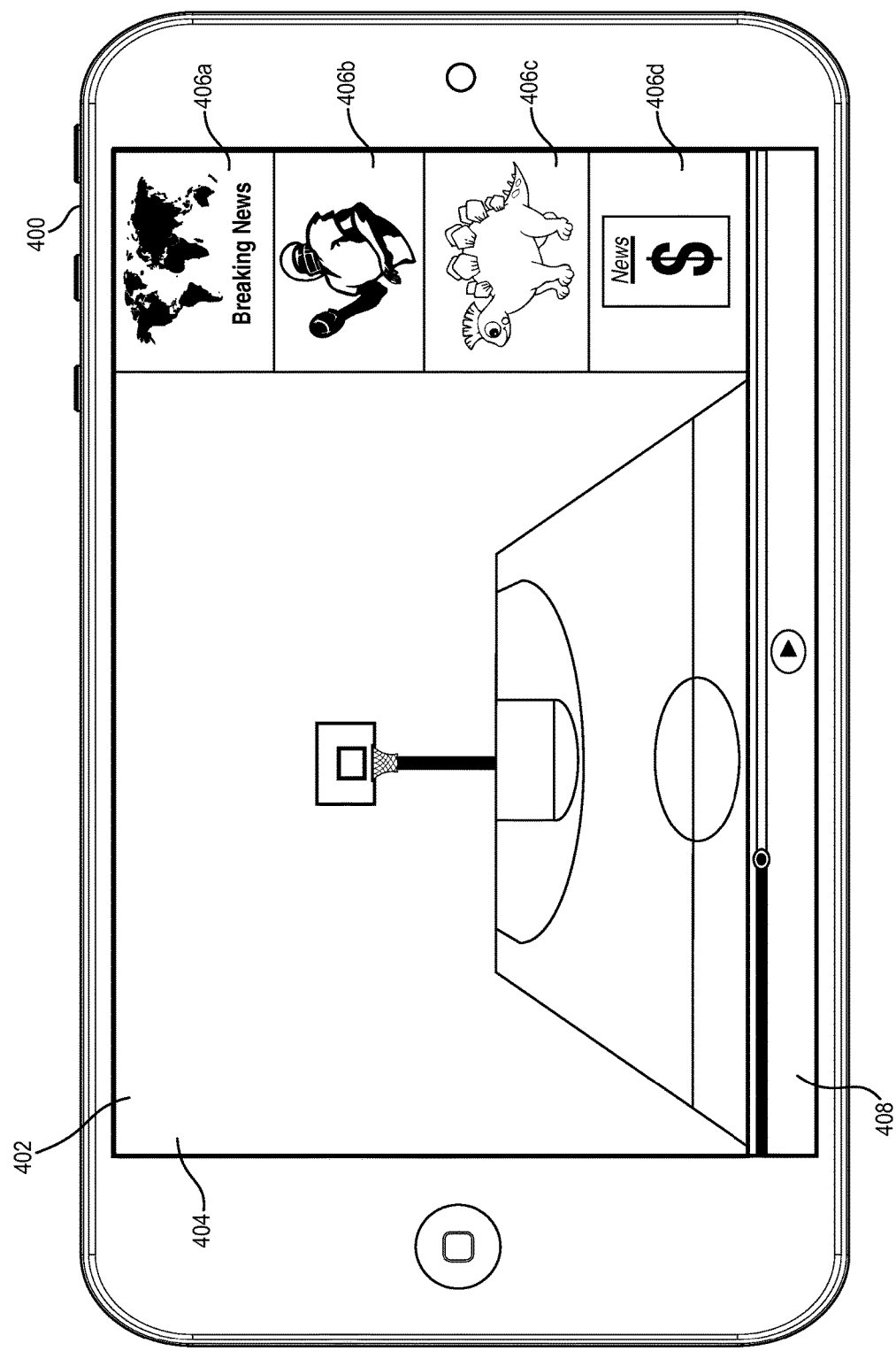
FIGS. 4A-4E illustrate user interfaces for displaying a plurality of content items in accordance with one or more embodiments.

FIG. 4A illustrates one embodiment of a user interface 402 for the client device 400. The user interface 402 may include a plurality of display areas in a display of the computing device. Specifically, the user interface 402 may include a primary display area 404 and one or more secondary display areas 406a-d. The primary display area 404 may display a first content item, and each secondary display area 406a-d may display an additional content item.

In one or more embodiments, one or more of the display areas (including the primary display area 404 and/or the secondary display areas 406a-d) can include content from the content provider 104, ad server 106, and/or a local storage device. According to some implementations, one or more content items in the user interface 402 can include streaming content. For example, one or more content items can include video content actively playing within the corresponding display areas. To illustrate, the primary display area 404 may include a streaming video, broadcast video, cable video, or satellite video playing in the user interface 402. Additionally, one or more of the secondary display areas 406a-d may include streaming video or other video content actively playing at the same time as the video in the primary display area 404.

In additional, or alternative, embodiments, one or more of the display areas may include content other than actively playing video content. Specifically, the content in each of the display areas may include content items that are representations of one or more types of content other than actively playing video content. For example, the content may be static images, including photos or other pictures that the user may view and navigate within the user interface 402. In another example, the content may be selectable icons or other images that allow the user to view or listen to streaming content (e.g., video or music). The user interface 402 may also include a combination of different types of content including, but not limited to, actively streaming/playing video content, text (e.g., article titles or brief summaries), or static images.

In one or more embodiments in which the primary display area 404 and the secondary display areas 406a-d contain video content, each content item may correspond to a different channel (e.g., broadcast, cable, satellite or streaming channel/website) or advertisement. Specifically, each content item may include video content that corresponds to one of a plurality of channels that the content provider 104 or ad server 106 is currently providing to the client device 400. For example, the primary display area 404 may contain a television show that the user has selected to view in the primary display area 404. Each of the secondary display areas 406a-d may contain a television show or advertisement that the client device 400, content provider 104, ad server 106, or the user has selected to display in the secondary display areas 406a-d.

Accordingly, one or more of the content items may be different genres, depending on the content associated with the television channels. To illustrate, the first content item in the primary display area 404 can be a basketball game associated with a channel that broadcasts or otherwise provides sporting events. One or more of the secondary display areas 406a-d may have content items that are related to the content in the primary display area 404. For example, a secondary display area 406b may include a content item that is a football game associated with a different channel that broadcasts or otherwise provides sporting events.

Additionally, or alternatively, one or more of the secondary display areas 406a-d may have content items that are unrelated to the content in the primary display area 404. Specifically, the secondary display areas 406a-d may include content for channels that the user or content management system 100 selects based on the user's interests and not necessarily based on the content in the primary display area 404. For example, the user may select channels that the user most frequently watches on the client device 400. To illustrate, one or more of the secondary display areas 406a-d can include content items such as news programs, programming for children, network television broadcasts, comedy shows, etc.

In one or more additional, or alternative, embodiments, the content in one or more of the display areas may include content stored locally. For example, the client device 400 may include a storage device or be in communication with a storage device that stores content that the client device 400 can access and present to the user within the user interface 402. To illustrate, the client device 400 can access movies, music, photographs, or other content that the user can view in the display area and/or in one or more of the secondary display areas 406*a-d*.

In one or more embodiments, the user interface 402 may include tools or other elements that allow the user to interact with the content in the user interface 402. For example, the user interface 402 may include playback elements 408 that allow the user to play, pause, rewind or fast-forward through the content item in the primary display area 404. Additionally, the playback elements 408 can include a timer bar that shows a current play time associated with the content item in the primary display area 404. The playback elements 408 may allow the user to interact with the playback of the content item in the primary display area 404 independently from the playback of the content items in the secondary display areas 406*a-d*.

Figure 4B:
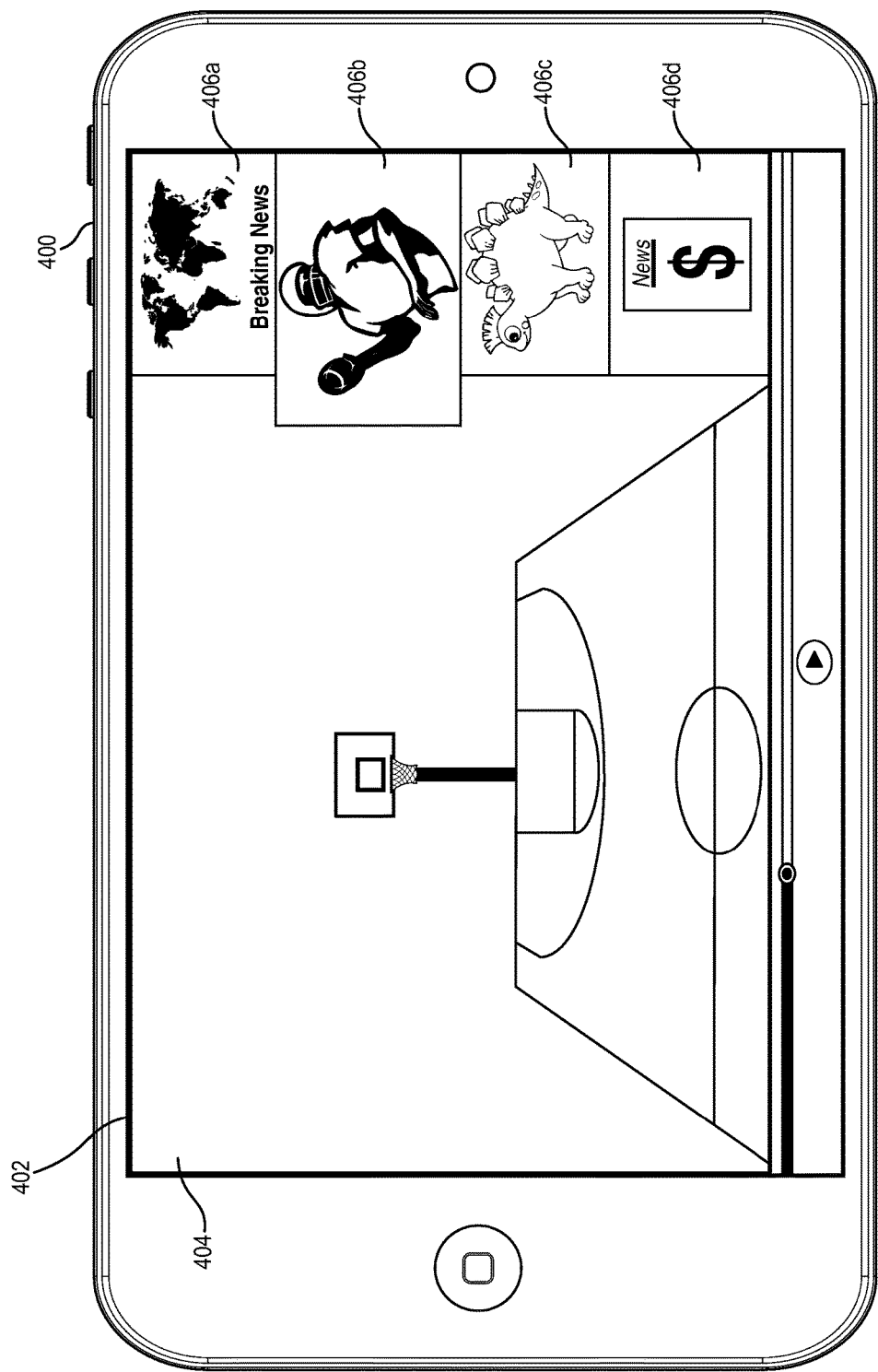

As previously described, the content management system 100 can emphasize content or perform one or more operations associated with the content in response to detecting that the visual focus of the user meets a predetermined threshold with respect to a content item. FIG. 4B illustrates the content management system 100 emphasizing a second content item in one of the secondary display areas 406*a-d*. Specifically, the content management system 100 can emphasize the second content item based on the visual focus of the user relative to the second content item meeting a predetermined threshold. For example, the content management system 100 can detect that the visual focus of the user transitions from the first content item to the second content item and remains on the second content item for a predetermined length of time.

In one or more embodiments, the content management system 100 can determine that the user is interested in the second content item in response to detecting that the visual focus of the user transitions to the second content item and remains on the second content item for a length of time meeting a predetermined threshold. Based on the interest of the user in the second content item, the content management system 100 can increase the size of the second content item. In particular, increasing the size of the second content item can allow the user to view more detail in the second content item. Additionally, increasing the size of the second content item can also increase the likelihood that the user will continue watching the second content item.

When increasing the size of the second content item in the secondary display area 406*b*, the content management system 100 can increase the size of the corresponding secondary display area 406*b*. As the secondary display area 406*b* changes size, the content item also changes size at the same rate as the secondary display area 406*b*. For example, the content management system 100 can change the size of the secondary display area 406*b* and the second content item gradually and/or continuously while the visual focus of the user remains on the second content item. In this manner, the content management system 100 can modify the display in a manner that the user may not notice the increasing size of the content item. Alternatively, the content management system 100 can change the size of the secondary display area 406*b* and the second content item in steps while the visual focus of the user remains on the second content item.

In one or more embodiments, the content management system 100 can increase the size of the content item and the corresponding secondary display area 406*b* independently from the other content items or display areas. For example, the content management system 100 can increase the size of the corresponding secondary display area 406*b* without changing the size of any of the other display areas. To illustrate, as the size of the second content item increases, the second content item and corresponding display area may at least partially cover one or more of the other secondary display areas 406*a-d* and/or the primary display area 404, as shown in FIG. 4B.

According to at least one embodiment, the content management system 100 can change the size of the second content item based on whether the visual focus of the user meets a plurality of predetermined thresholds. Specifically, the content management system 100 may begin increasing the size of the second content item in response to detecting that the visual focus of the user relative to the second content item meets a first time threshold. The content management system 100 may increase the size of the second content item at a first rate until the visual focus of the user relative to the second content item meets a second time threshold. Additionally, or alternatively, the content management system 100 may stop increasing the size of the second content item once the second content item reaches a certain size.

Figure 4C:
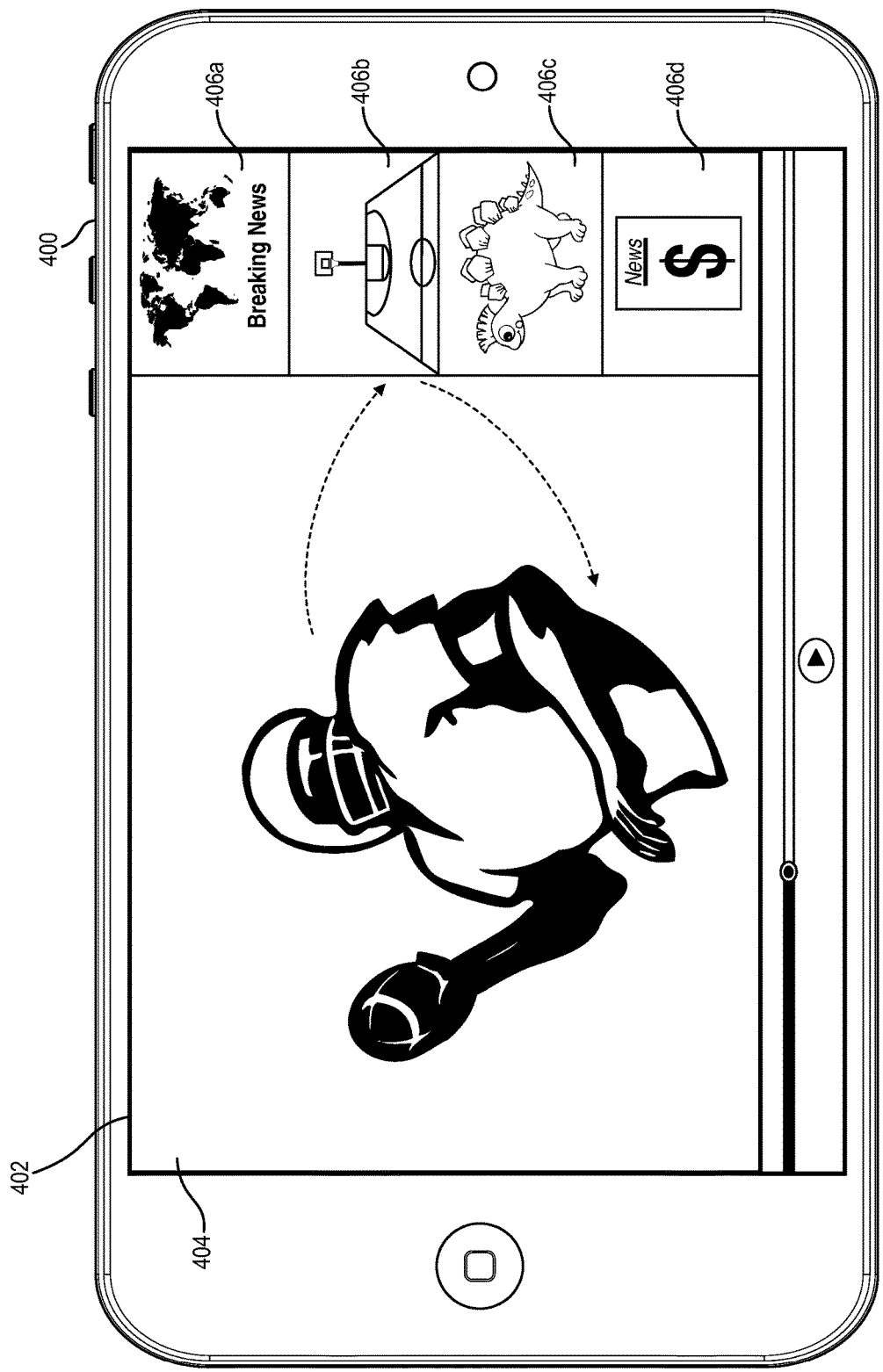

The content management system 100 may determine that the visual gaze of the user relative to the second content item meets a second time threshold. The content management system 100 can then increase the size of the second content item at a second rate faster than the first rate and/or perform other operations with respect to the second content item in the user interface 402. For example, in response to detecting that the visual focus of the user meets a second threshold, the content management system 100 may increase the size of the second content item to a maximum size. To illustrate, the content management system 100 may increase the size of the second content item to the size of the first display area. Additionally, the content management system 100 may move the position of the second content item to the first display area, as illustrated in FIG. 4C.

Additional, or alternative, embodiments may make adjustments to other attributes of the second content item while the visual focus of the user remains on the second content item or when the visual focus meets another threshold. In particular, in addition to, or alternatively to, increasing the size of the second content item, the content management system 100 can increase a volume associated with the second content item or provide closed captioning for the second content item. For example, when the content management system 100 starts increasing the size of the second content item, the content management system 100 may also start increasing the volume associated with the second content item. Additionally, the content management system 100 may begin decreasing the volume associated with the first content item to further emphasize the second content item and to avoid distracting the user. Alternatively, the content management system 100 can begin increasing the volume associated with the second content item after the visual focus of the user meets a different predefined threshold than the first time threshold for increasing the size of the second content item. For example, the content management system 100 can increase the volume before or after increasing the size of the second content item.

In one or more additional embodiments, the content management system 100 may modify one or more of the content items in other display areas of the display while emphasizing the second content item. For example, the content management system 100 can adjust a brightness, visibility, or optical focus of the second content item and the one or more other content items. To illustrate, content items in the secondary display areas 406*a-d* may have a lower brightness level than the first content item so that the user can more easily focus on the primary display area 404. As the visual focus of the user transitions to the second content item, the content management system 100 can increase the brightness of the second content item. Additionally, the content management system 100 can decrease brightness associated with the first content item and/or the other content items in the secondary display areas 406a-d, for example, until the second content item is the only content item displayed.

In one or more embodiments, the content management system 100 can also reduce the size of, or otherwise deemphasize, content items based on whether the visual focus of the user has transitioned away from the content items for a period of time. For example, if the visual focus of the user relative to the second content item meets a first threshold, the content management system 100 begins increasing the size of the second content item and decreasing the size of the first content item simultaneously. If the visual focus of the user then transitions away from the second content item for a period of time meeting a second threshold, the content management system 100 can decrease the size of the second content item to an original size. Thus, the content management system 100 can dynamically increase and decrease the size or change other attributes of different content items on the display depending on where the user is looking.

In one or more embodiments, if the content management system 100 changes the position of the second content item to the primary display area 404, the content management system 100 may also change the position of the first content item to one or more of the secondary display areas 406a-d. For example, the content management system 100 may reposition the first content item to the secondary display area 406b previously occupied by the second content item. Thus, the content management system 100 can swap the positions of the first content item and the second content item. Alternatively, the content management system 100 can move the first content item to one of the other secondary display areas 406a-d. For example, the content management system 100 can move the secondary display area 406a at the top of the user interface 402 or to a display area based on a determined engagement level for the first content item. The content management system 100 can shift each of the other content items in the secondary display areas 406a-d may downward until all of the secondary display areas 406a-d contain content items.

As mentioned previously, the content management system 100 can also include a machine-learning model for providing or displaying content based on previous user interactions with the content. For example, as the visual focus of the user transitions among content items, the content management system 100 can learn which methods of emphasizing content are more likely to capture the user's interest and which methods of emphasizing content are more likely to distract the user or cause the user to stop looking at the display. To illustrate, the content management system 100 can learn that increasing the size of a content item too slowly causes the user to look away from the content item. Thus, the content management system 100 can adjust the change rate to increase content items more quickly. Alternatively, the content management system 100 can learn that increasing the size of advertisements causes the user to lose interest (e.g., constricted pupils or transition of the visual focus away from the advertisement), and can stop increasing the size of advertisements altogether. Thus, the content management system 100 can save preferences or settings for the user based on the visual gaze information to maximize the time that the user spends looking at the display and/or specific content items.

Figure 4D:
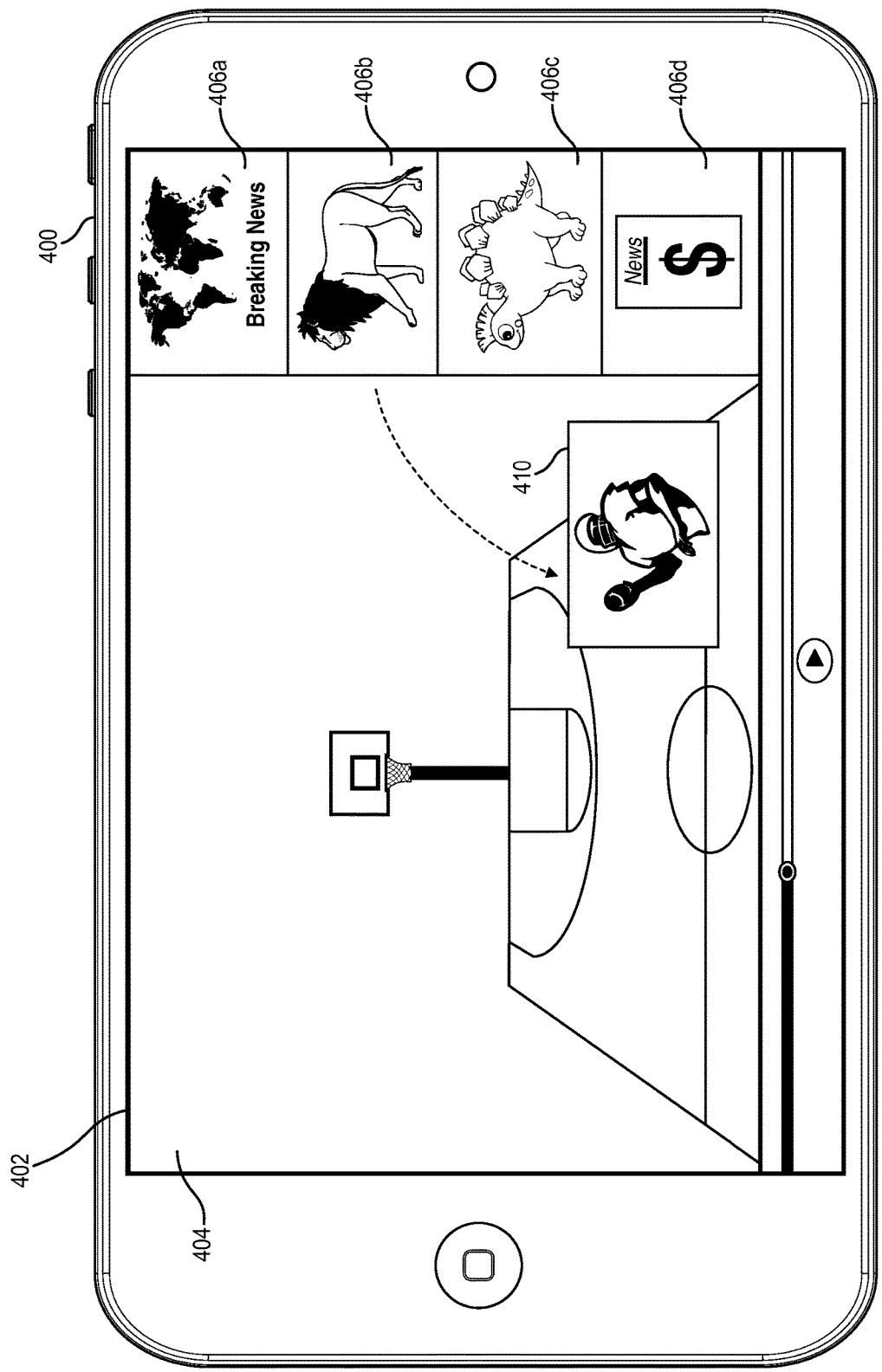

In at least one embodiment, the content management system 100 can move the second content item to the primary display area 404 with the first content item in response to determining that the visual focus of the user meets a predetermined threshold. Specifically, the primary display area 404 may include more than one position for including content items. For example, FIG. 4D shows an embodiment of the primary display area 404 that includes a first position and a second position. To illustrate, the primary display area 404 may include a picture-in-picture position 410 for displaying the second content item in the second position overlaid on top of the first content item in the first position. In one implementation, the second position in the primary display area 404 can include a smaller area so that the second content item covers only a small portion of the first content item.

Additionally, if the content management system 100 moves the second content item to the primary display area 404, the content management system 100 can replace the second content item with another content item in the corresponding secondary display area 406b. For example, FIG. 4D illustrates a new content item replacing the second content item in the vacated secondary display area 406b. In one or more implementations, the content management system 100 can select the new content item based on user interests or based on content similar to the second content item.

Figure 4E:
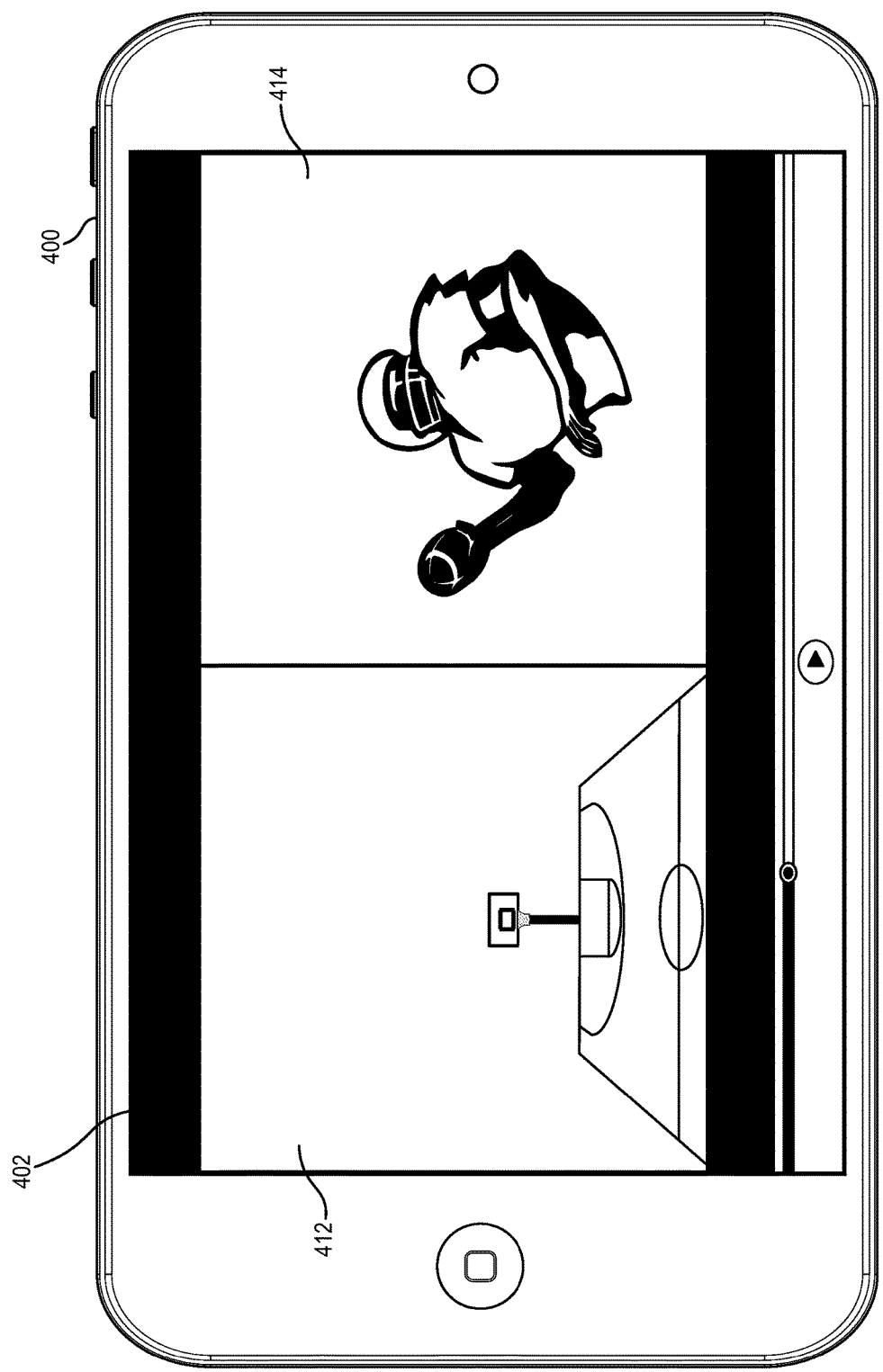

In one or more embodiments, the content management system 100 can display the second content item next to the first content item within the user interface 402, as illustrated in FIG. 4E. For example, the content management system 100 may include two or more display areas of the same size, allowing the user or a plurality of users to watch two or more content items in the same user interface 402. To illustrate, if a plurality of users are viewing different content items in the user interface 402, the content management system 100 can identify the visual focus of two or more groups (corresponding to the number of available display areas or positions in the user interface 402) relative to two or more content items. The content management system 100 can then display the two or more content items on the display in a first display area 412 and a second display area 414. The content management system 100 can also increase or decrease the number of large display areas (e.g., split a display into additional display areas or combine several display areas) based on a determination that a single group of users start watching different content items or that more than one group of users start watching the same content item.

Additionally, or alternatively, the content management system 100 may include more than one display device. The two or more display areas may each correspond to a separate display device, such that the client device 400 can display the two or more content items on separate display devices. For instance, if the content management system 100 detects the visual focus of a first group of users relative to a first content item and the visual focus of a second group of users relative to a second content item, the content management system 100 can display the first content item on a first display device and the second content item on a second display device. The client device 400 may include separate speakers that allow the groups of users to hear the content of one or both of the content items shown on the client device 400.

In one or more examples, the content management system 100 may determine which content item to show on which device based on an average position of the users. Specifically, the content management system 100 can detect where each user is located and store the location of each user with the visual gaze information. The content management system 100 can then group the users based on the corresponding content items that are the target of the visual focus of the users in each group. The content management system 100 can then determine an average position of each group of users relative to the display devices and display the content items on the corresponding display devices.

FIGS. 3A-4E illustrate personal computing devices. One will appreciate in light of the disclosure herein that additional or alternative embodiments can include other types of client devices, such as, but not limited to televisions and video boards. In one embodiment, a user can open a video experience with several videos in a video-wall collage. Each video can initially be paused with optional visual descriptive overlays (i.e., textual descriptions of the videos). The aggregation of videos can comprise videos selected based on the user profiles or previous viewing habits of the users.

Upon the content management system 100 detecting that a user's gaze focuses on a center of any video, the content management system 100 can remove the overlay and begin playing the video/audio. Upon the content management system 100 detecting that the user's gaze remains fixed upon the video, the content management system 100 can resize the video to occupy the majority or the entire screen or video board. In alternative embodiments, the content management system 100 can resize the video at a configurable rate/delay. Optionally, a visual gaze pattern (such as a look and hold at a corner of the active video) can cause the content management system 100 to open the video in a full-screen display. At this point, the content management system 100 can cause the other videos to resize (i.e., shrink), disappear, or be covered by the primary video.

In addition the foregoing content manipulations, the content management system 100 can allow a user to control the content intentionally with their visual gaze. For example, the content management system 100 can detect the user look way from the primary video. In response to the look-away, the content management system 100 can return to the original video-wall collage with the overlays.

FIGS. 1-4E, the corresponding text, and the examples, provide a number of different systems and devices for tracking visual gaze information and providing content and analytics based on the visual gaze information. In addition to the foregoing, embodiments can be described in terms of flowcharts comprising acts and steps in a method for accomplishing a particular result. For example, FIGS. 5 and 6 illustrate flowcharts of exemplary methods in accordance with one or more embodiments.

Figure 5:
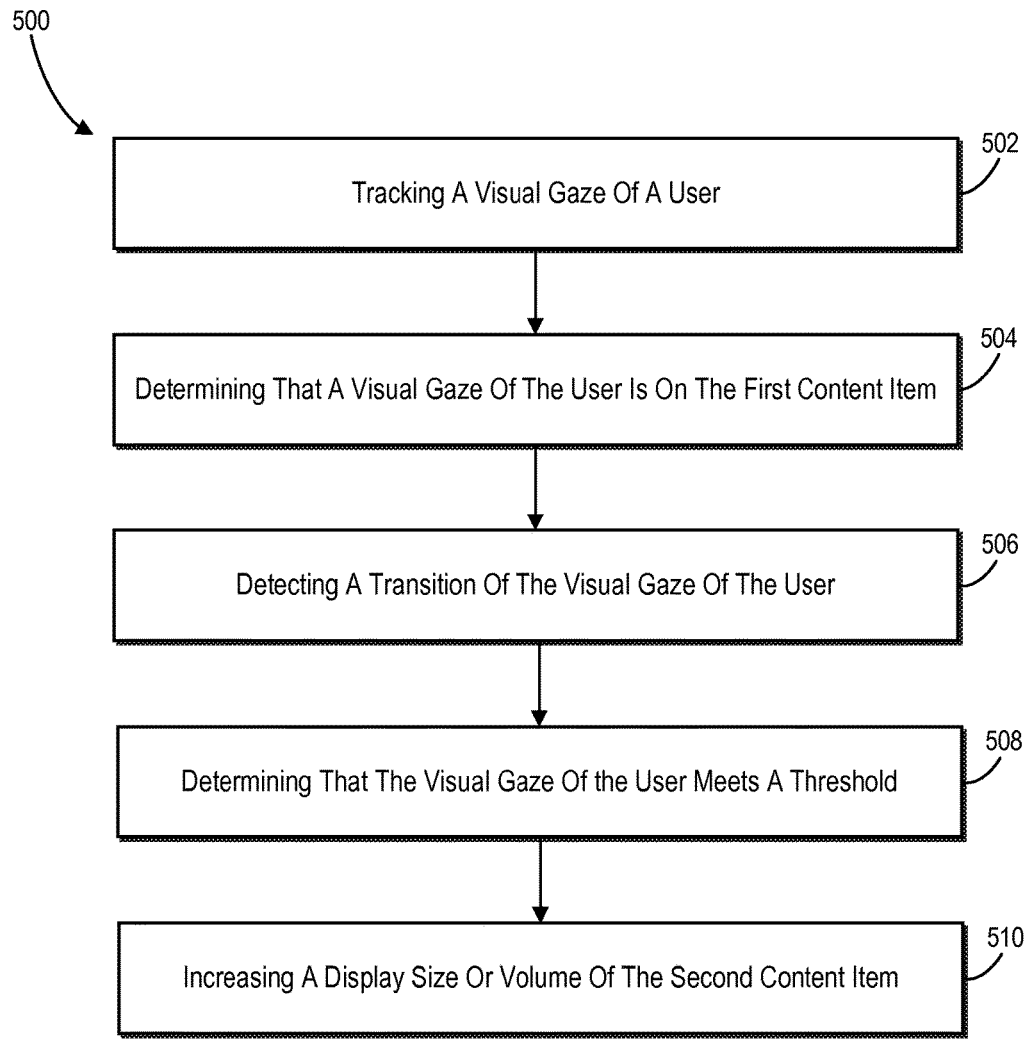
FIG. 5 illustrates a flowchart of a series of acts in a method of tracking visual gaze information for visual content in accordance with one or more embodiments.
Figure 6:
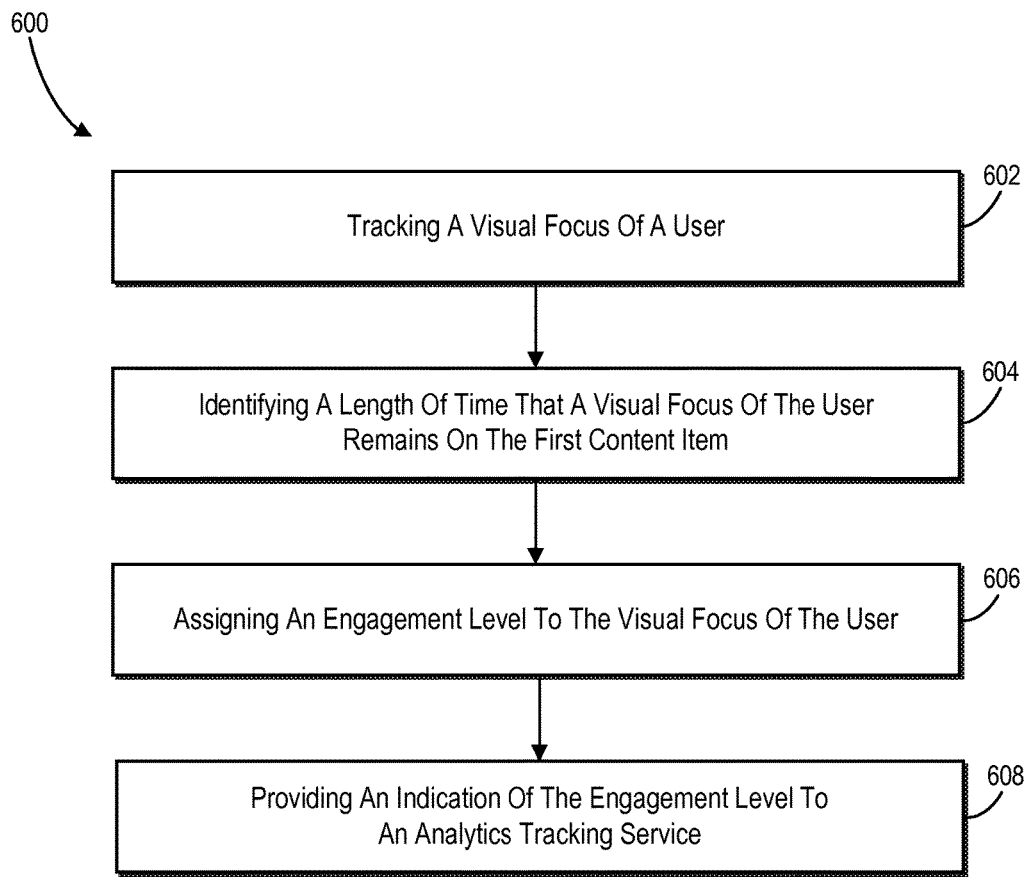
FIG. 6 illustrates a flowchart of a series of acts in another method of tracking visual gaze information for visual content in accordance with one or more additional embodiments.

FIG. 5 illustrates a flowchart of a method 500 of tracking visual gaze information for visual content. The method 500 includes an act 502 of tracking a visual gaze of a user. For example, act 502 involves tracking, by an image capture device, a visual gaze of a user with respect to a display of a computing device. In one example, act 502 can involve capturing a plurality of images of eyes of the user using an image capture device in communication with at least one processor. To illustrate, act 502 can involve communicating the captured images to the at least one processor. The processor can then use the images to detect where on the display area the eyes of the user are focused as described above. For example, processor can calculate a vector from one or more eyes of the user to the display of the computing device based on images of the one or more eyes of the user taken by the image capture device. The display includes a first content item in a primary display area 304, 404 of the display and a second content item in a secondary display area 306, 406a-d of the display. To illustrate, act 502 can involve tracking the visual gaze of the user with respect to a grid corresponding to physical locations of the display. Act 502 can also involve tracking visual gazes of a plurality of users of the computing device. In particular, act 502 can involve using facial recognition to identify the eyes of one or more users. Act 502 can further involve identifying a portion of the display at which the eyes of the user are focused based on data/images obtained by a camera of the computing device.

The method 500 also includes an act 504 of determining that a visual focus of the user is on the first content item. For example, act 504 can involve determining that the visual focus of the user is on a physical location of the display of the computing device corresponding to the first content item. To illustrate, act 504 can involve determining that the visual focus of the user is within a grid block corresponding to a physical location at which the first content item is displayed in the display based on the calculated vector. Act 504 can also involve determining that a visual focus of a consensus of a plurality of users is on the first content item.

Additionally, the method 500 includes an act 506 of detecting a transition of the visual focus of the user. For example, act 506 involves detecting a transition of the visual focus of the user from the first content item to the second content item. To illustrate, act 506 can involve determining that the visual focus of the user transitions from the primary display area 304, 404 corresponding to the first content item to the secondary display area 306, 406a-d corresponding to the second content item. Additionally, or alternatively, act 506 can involve detecting that the visual focus of the user transitions from a location in a grid block corresponding to the first content item to a grid block corresponding to the second content item. Act 506 can also involve detecting a transition of the visual focus of a consensus of a plurality of users from the first content item to the second content item.

As part of act 506, or as an additional act, the method 500 can include detecting a second transition of the visual focus of the user from the second content item back to the first content item. The method 500 can also include determining that the visual focus of the user with respect to the first content item meets a second predetermined threshold without transitioning to another content item in the secondary display area 306, 406a-d. The method 500 can further include changing the first predetermined threshold in response to the visual focus of the user with respect to the first content item meeting the second predetermined threshold.

The method 500 further includes an act 508 of determining that the visual focus of the user meets a threshold. For example, act 508 involves determining that the visual focus of the user with respect to the second content item meets a first predetermined threshold. To illustrate, act 508 can involve determining that the visual focus of the user remains on the second content item for a first predetermined time threshold. Alternatively, act 508 can involve determining that an aggregated length of time in which the visual focus of the user is on the second content item satisfies a first predetermined time threshold within a predetermined time period.

Act 508 can also involve determining that the visual focus of a consensus of a plurality of users with respect to the second content item meets the first predetermined threshold. Alternatively, act 508 can involve determining that a visual focus of a first group of the plurality of users is on the first content item and a visual focus of a second group of the plurality of users transitions to the second content item.

As part of act 508, or as an additional act, the method 500 can include determining that the visual focus of the user with respect to the second content item meets a second predetermined threshold. The method 500 can also include, in response to the visual focus of the user with respect to the second content item meeting the second predetermined threshold, increasing the display size of the second content item to fit to the primary display area 304, 404 of the display. Additionally, the method 500 can include switching a position of the first content item with a position of the second content item in response to the visual focus of the user with respect to the second content item meeting the second predetermined threshold. Additionally, or alternatively, the method can include, in response to the visual focus of the user with respect to the second content item meeting the second predetermined threshold, decreasing a display size or a volume associated with one or more other content items in the display.

The method 500 also includes an act 510 of increasing a display size or volume of the second content item. For example, act 510 involves in response to the visual focus of the user with respect to the second content item meeting the predetermined threshold, increasing one or more of a display size of the second content item or a volume associated with the second content item. To illustrate, act 510 can involve continuously increasing the display size of the second content item on the display while the visual focus of the user remains on the second content item. Alternatively, act 510 can involve increasing the display size of the second content item according to predetermined step sizes while the visual focus of the user remains on the second content item.

Act 510 can also involve, in response to the visual focus of the consensus with respect to the second content item meeting the first predetermined threshold, increasing one or more of the display size of the second content item or the volume associated with the second content item. Alternatively, act 510 can involve maintaining the first content item in a first position of the primary display area 304, 404 of the display and positioning the second content item in a second position of the primary display area 304, 404 of the display. In other words, act 510 can involve automatically modifying or changing content based on changes in the user's visual gaze regardless to whether the user consciously makes a selection to change or modify the content.

FIG. 6 illustrates a flowchart of a method 600 of tracking visual gaze information for visual content. The method 600 includes an act 602 of tracking a visual gaze of a user. For example, act 602 involves tracking, by an image capture device, a visual gaze of a user with respect to a display of a computing device, the display including a first content item. In one example, act 602 can involve capturing a plurality of images of eyes of the user using an image capture device in communication with at least one processor. To illustrate, act 602 can involve communicating the captured images to the at least one processor. Additionally, act 602 can involve tracking the visual gaze of the user with respect to a grid corresponding to physical locations of the display.

The method 600 further includes an act 604 of identifying a length of time that a visual focus of the user remains on the first content item. For example, act 604 can involve identifying a continuous length of time that the visual focus of the user remains on the first content item. Alternatively, act 604 can involve identifying an aggregated length of time that the visual focus of the user remains on the first content item. Act 604 can also involve identifying a length of time that the visual focus of the user remains on the first content item within a predetermine time period. Additionally, act 604 can involve identifying an amount of time that the visual focus of the user looks away from the first content item.

The method 600 also includes an act 606 of assigning an engagement level to the visual focus of the user. For example, act 606 involves assigning an engagement level to the visual focus of the user on the first content item based on the length of time that the visual focus of the remains on the first content item. To illustrate, act 606 can involve collecting additional visual gaze information for the user and modifying the engagement level assigned to the visual focus of the user based on the additional visual gaze information. Act 606 can also involve assigning the engagement level based on a number of predetermined thresholds that the visual focus of the user meets.

As part of act 606, or as an additional act, the method 600 can include identifying a number of times that the visual focus of the user leaves and returns to the first content item. Act 606 can further involve assigning the engagement level based on the number of times that the visual focus of the user leaves and returns to the first content item.

As part of act 606, or as an additional act, the method 600 can also include determining that the visual focus of the user leaves the first content item and returns to the content item after a length of time. Act 606 can involve assigning the engagement level based on the length of time that the visual focus of the user is away from the first content item.

As part of act 606, or as an additional act, the method 600 can include detecting a change in pupil dilation of the user while the visual focus of the user is on the first content item. Act 606 can additionally involve assigning the engagement level based on the change in pupil dilation of the user.

The method 600 further includes an act 608 of providing an indication of the engagement level to an analytics tracking service. For example, act 608 can involve sending the indication of the engagement level to the analytics server 108 in association with the corresponding content item. To illustrate, act 608 can involve sending an indication that the engagement level of the user corresponds to a high interest in the corresponding content item or a low interest in the corresponding content item.

As part of act 608, or as an additional act, the method 600 can include identifying a characteristic of the first content item. The method 600 can also include providing a new content item on the display based on the assigned engagement level, the new content item comprising the identified characteristic.

Additionally, or alternatively, the method 600 can include determining, based on the visual gaze of the user, that the focus of the user transitions among a plurality of content items. The method 600 can include identifying a common characteristic associated with the plurality of content items. The method 600 can also include providing one or more new content items comprising the identified common characteristic.

The method 600 can further include identifying a transition of the visual focus of the user from the first content item in a primary display area 304, 404 of the display to a second content item in a secondary display area 306, 406*a-d* of the display. The method 600 can also include identifying a length of time that the visual focus of the user remains on the second content item. The method 600 can include assigning a second engagement level to the visual focus of the user on the second content item based on the length of time that the visual focus of the user remains on the second content item. Additionally, the method 600 can include providing an indication of the engagement level for the visual focus of the user on the second content item to the analytics tracking service.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 7:
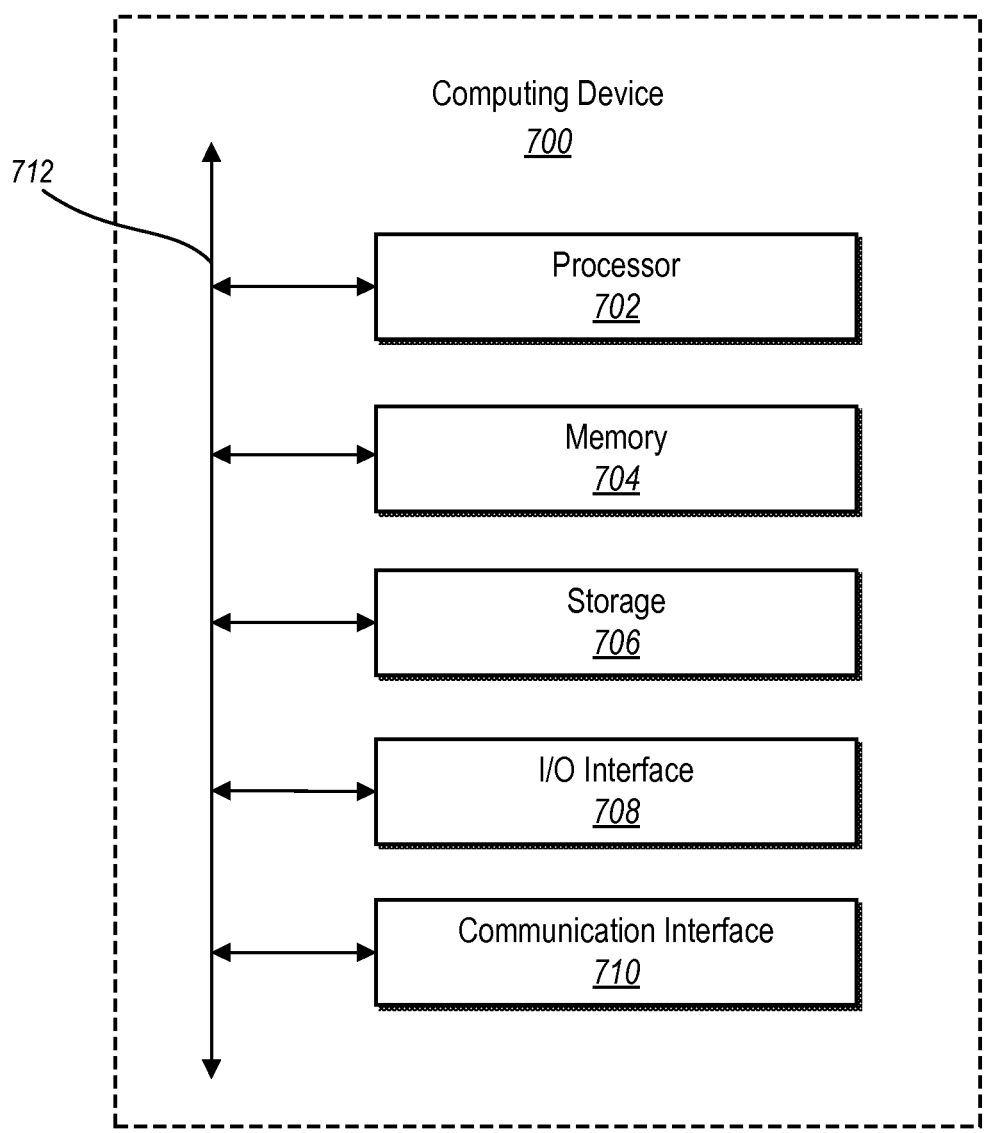
FIG. 7 illustrates a block diagram of an exemplary computing device in accordance with one or more embodiments.

FIG. 7 illustrates a block diagram of exemplary computing device 700 that may be configured to perform one or more of the processes described above. One will appreciate that one or more computing devices such as the computing device 700 may implement the content management system 100. As shown by FIG. 7, the computing device 700 can comprise a processor 702, a memory 704, a storage device 706, an I/O interface 708, and a communication interface 710, which may be communicatively coupled by way of a communication infrastructure 712. While an exemplary computing device 700 is shown in FIG. 7, the components illustrated in FIG. 7 are not intended to be limiting. Additional or alternative components may be used in other embodiments. Furthermore, in certain embodiments, the computing device 700 can include fewer components than those shown in FIG. 7. Components of the computing device 700 shown in FIG. 7 will now be described in additional detail.

In one or more embodiments, the processor 702 includes hardware for executing instructions, such as those making up a computer program. As an example and not by way of limitation, to execute instructions, the processor 702 may retrieve (or fetch) the instructions from an internal register, an internal cache, the memory 704, or the storage device 706 and decode and execute them. In one or more embodiments, the processor 702 may include one or more internal caches for data, instructions, or addresses. As an example and not by way of limitation, the processor 702 may include one or more instruction caches, one or more data caches, and one or more translation lookaside buffers (TLBs). Instructions in the instruction caches may be copies of instructions in the memory 704 or the storage 706.

The memory 704 may be used for storing data, metadata, and programs for execution by the processor(s). The memory 704 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 704 may be internal or distributed memory.

The storage device 706 includes storage for storing data or instructions. As an example and not by way of limitation, storage device 706 can comprise a non-transitory storage medium described above. The storage device 706 may include a hard disk drive (HDD), a floppy disk drive, flash memory, an optical disc, a magneto-optical disc, magnetic tape, or a Universal Serial Bus (USB) drive or a combination of two or more of these. The storage device 706 may include removable or non-removable (or fixed) media, where appropriate. The storage device 706 may be internal or external to the computing device 700. In one or more embodiments, the storage device 706 is non-volatile, solid-state memory. In other embodiments, the storage device 706 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 708 allows a user to provide input to, receive output from, and otherwise transfer data to and receive data from computing device 700. The I/O interface 708 may include a mouse, a keypad or a keyboard, a touch screen, a camera, an optical scanner, network interface, modem, other known I/O devices or a combination of such I/O interfaces. The I/O interface 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 708 is configured to provide graphical data to a display for presentation to a user. The graphical data may be representative of one or more graphical user interfaces and/or any other graphical content as may serve a particular implementation.

The communication interface 710 can include hardware, software, or both. In any event, the communication interface 710 can provide one or more interfaces for communication (such as, for example, packet-based communication) between the computing device 700 and one or more other computing devices or networks. As an example and not by way of limitation, the communication interface 710 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 710 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 710 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 710 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 712 may include hardware, software, or both that couples components of the computing device 700 to each other. As an example and not by way of limitation, the communication infrastructure 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present disclosure is, therefore, indicated by the appended claims rather than by the foregoing description. All changes that come within the meaning and range of equivalency of the claims are to be embraced within their scope.

What is claimed is:

1. A method of tracking visual gaze information for visual content, the method comprising:
    tracking, by an image capture device in communication with at least one processor, a visual gaze of a user with respect to a display device of a computing device by calculating a vector from one or more eyes of the user to the display device of the computing device based on images of the one or more eyes of the user taken by the image capture device, the display device including a first content item in a primary display area of the display device and a second content item in a secondary display area of the display device;
    determining, by the at least one processor, that the visual gaze of the user is on the first content item in the primary display area;
    detecting, by the at least one processor, a transition of the visual gaze of the user from the first content item in the primary display area to the second content item in the secondary display area;
    determining, by the at least one processor, that the visual gaze of the user with respect to the second content item meets a first predetermined threshold;
    in response to the visual gaze of the user with respect to the second content item meeting the first predetermined threshold, increasing, at the computing device by the at least one processor, one or more of a display size of the second content item in the secondary display area to a first increased size or a volume associated with the second content item to a first increased volume;
    determining that the visual gaze of the user remains on the second content item after meeting the first predetermined threshold until meeting a second predetermined threshold; and switching, by the at least one processor and in response to the visual gaze of the user with respect to the second content item meeting the second predetermined threshold, a position of the first content item with a position of the second content item on the display device while the visual gaze of the user remains on the second content item by moving the first content item from the primary display area of the display device to the secondary display area of the display device and moving the second content item from the secondary display area of the display device to the primary display area of the display device.

2. The method as recited in claim 1, wherein determining that the visual gaze of the user with respect to the second content item meets the first predetermined threshold comprises determining that the visual gaze of the user remains on the second content item for a first predetermined time threshold.

3. The method as recited in claim 1, wherein determining that the visual gaze of the user with respect to the second content item meets the first predetermined threshold comprises determining that an aggregated length of time in which the visual gaze of the user is on the second content item satisfies a first aggregate predetermined time threshold within a predetermined time period.

4. The method as recited in claim 1, wherein switching the position of the first content item with the position of the second content item on the display device comprises increasing the display size of the second content item to fit to the primary display area of the display device.

5. The method as recited in claim 4, wherein switching the position of the first content item with the position of the second content item on the display device comprises decreasing a size of the first content item to fit to the secondary display area of the display.

6. The method as recited in claim 1, further comprising: in response to the visual gaze of the user with respect to the second content item meeting the second predetermined threshold, decreasing a display size or a volume associated with one or more other content items in the display device.

7. The method as recited in claim 1, further comprising:
    detecting a second transition of the visual gaze of the user from the second content item back to the first content item;
    determining that the visual gaze of the user with respect to the first content item meets a third predetermined threshold; and
    decreasing, by the at least one processor, one or more of the display size of the second content item or the volume associated with the second content item.

8. The method as recited in claim 1, further comprising:
    tracking visual gazes of a plurality of users of the computing device;
    determining that a visual gaze of a consensus of the plurality of users is on the first content item;
    detecting a transition of the visual gaze of the consensus from the first content item to the second content item;
    determining that the visual gaze of the consensus with respect to the second content item meets the first predetermined threshold; and
    in response to the visual gaze of the consensus with respect to the second content item meeting the first predetermined threshold, increasing one or more of the display size of the second content item or the volume associated with the second content item.

9. The method as recited in claim 1, further comprising:
    tracking visual gazes of a plurality of users of the computing device;
    determining that a visual gaze of a first group of the plurality of users is on the first content item and a visual gaze of a second group of the plurality of users transitions to the second content item;
    maintaining the first content item in a first position of the primary display area of the display device; and
    repositioning the second content item in a second position of the primary display area of the display device.

10. The method as recited in claim 1, wherein increasing the display size of the second content item comprises continuously increasing the display size of the second content item on the display device while the visual gaze of the user remains on the second content item after meeting the first predetermined threshold and without the user explicitly selecting the second content item until the display size of the second content item fits to the primary display area of the display device.

11. The method as recited in claim 1, wherein increasing the display size of the second content item comprises increasing the display size of the second content item according to predetermined step sizes while the visual gaze of the user remains on the second content item after meeting the first predetermined threshold and without the user explicitly selecting the second content item until the display size of the second content item fits to the primary display area of the display device.

12. A non-transitory computer readable medium storing instructions that, when executed by at least one processor, cause a computing device to:
   track, by an image capture device in communication with the at least one processor, a visual focus of a user with respect to a display device of the computing device by calculating a vector from one or more eyes of the user to the display device of the computing device based on images of the one or more eyes of the user taken by the image capture device, the display device including a first content item in a primary display area of the display device and a second content item in a secondary display area of the display device, the display including the first content item;
   determine that the visual focus of the user is on the first content item in the primary display area; determine that the visual focus of the user transitions from the first content item in the primary display area to the second content item in the secondary display area for a first predetermined threshold;
   in response to the focus of the user with respect to the second content item meeting the first predetermined threshold, increase a display size of the second content item in the secondary display area to a first increased size;
   determine that the visual focus of the user remains on the second content item after meeting the first predetermined threshold until meeting a second predetermined threshold; and
   switch, in response to the visual focus of the user with respect to the second content item meeting the second predetermined threshold, a position of the first content item with a position of the second content item on the display device while the visual focus of the user remains on the second content item by moving the first content item from the primary display area of the display device to the secondary display area of the display device and moving the second content item from the secondary display area of the display device to the primary display area of the display device.

13. The non-transitory computer readable medium as recited in claim 12, wherein the instructions, when executed by the at least one processor, further cause the computing device to:
   identify a length of time that the visual focus of the user remains on the second content item;
   assign an engagement level to the visual focus of the user on the second content item based on the length of time that the visual focus of the user remains on the second content item; and
   provide an indication of the engagement level for the visual focus of the user on the second content item to an analytics tracking service.

14. The non-transitory computer readable medium as recited in claim 13, wherein the instructions, when executed by the at least one processor, further cause the computing device to:
   identify a number of times that the visual focus of the user leaves and returns to the second content item;
   wherein the instructions that cause the computing device to assign the engagement level comprise instructions that cause the computing device to assign the engagement level based on the number of times that the visual focus of the user leaves and returns to the second content item.

15. The non-transitory computer readable medium as recited in claim 13, wherein the instructions, when executed by the at least one processor, further cause the computing device to:
   determine that the visual focus of the user leaves the second content item and returns to the first content item after a length of time,
   wherein the instructions that cause the computing device to assign the engagement level comprise instructions that cause the computing device to assign the engagement level based on the length of time that the visual focus of the user is away from the second content item.

16. The non-transitory computer readable medium as recited in claim 13, wherein the instructions, when executed by the at least one processor, further cause the computing device to:
   detect a change in pupil dilation of the user while the visual focus of the user is on the second content item,
   wherein the instructions that cause the computing device to assign the engagement level comprise instructions that cause the computing device to assign the engagement level based on the change in pupil dilation of the user.

17. The non-transitory computer readable medium as recited in claim 13, wherein the instructions, when executed by the at least one processor, further cause the computing device to:
   identify a characteristic of the second content item; and
   provide a new content item on the display device based on the assigned engagement level, the new content item comprising the identified characteristic.

18. The non-transitory computer readable medium as recited in claim 12, wherein the instructions, when executed by the at least one processor, further cause the computing device to:
   determine, based on the visual focus of the user, that the focus of the user transitions among a plurality of content items;
   identify a common characteristic associated with the plurality of content items; and
   provide one or more new content items comprising the identified common characteristic.

19. A system for tracking visual gaze information for visual content, the system comprising:
   at least one processor;
   an image capture device; and
   at least one non-transitory computer readable storage medium storing instructions thereon, that, when executed by the at least one processor, cause the system to:
   track, by the image capture device, a visual gaze of a user with respect to a display device of a computing device by calculating a vector from one or more eyes of the user to the display device of the computing device based on images of the one or more eyes of the user taken by the image capture device, the display device including a first content item in a primary display area of the display device and a second content item in a secondary display area of the display device;
   determine that the visual gaze of the user is on the first content item in the primary display area;
   detect a transition of the visual gaze of the user from the first content item in the primary display area to the second content item in the secondary display area;

determine that the visual gaze of the user remains on the second content item for a first predetermined time threshold; and in response to the visual gaze of the user remaining on the second content item for the first predetermined time threshold, and while the visual gaze of the user remains on the second content item after meeting the first predetermined time threshold;

increase, at the computing device, a display size of the second content item in the secondary display area;

decrease, at the computing device, a display size of one or more other content items in the secondary display area of the display device;

determine that the visual gaze of the user remains on the second content item after meeting the first predetermined time threshold until meeting a second predetermined time threshold; and switch, in response to the visual gaze of the user with respect to the second content item meeting the second predetermined threshold, a position of the first content item with a position of the second content item on the display device while the visual gaze of the user remains on the second content item by moving the second content item from the primary display area of the display device to the secondary display area of the display device and moving the second content item from the secondary display area of the display device to the primary display area of the display device.

20. The system as recited in claim 19, further comprising instructions that, when executed by the at least one processor, cause the system to switch the position of the first content item, the switching comprising:

continuing to increase the display size of the second content item until the display size of the second content item fits to a size of the primary display area of the display device; and moving the second content item to the primary area of the display device when the display size of the second content item fits to the size of the primary display area.

* * * * *